United States Patent
Hayakawa et al.

(10) Patent No.: US 8,340,457 B2
(45) Date of Patent: Dec. 25, 2012

(54) IMAGE ANALYSIS METHOD, IMAGE ANALYSIS PROGRAM AND PIXEL EVALUATION SYSTEM HAVING THE SAMES

(75) Inventors: Masahiko Hayakawa, Atsugi (JP); Tatsuji Nishijima, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/162,602

(22) Filed: Jun. 17, 2011

(65) Prior Publication Data

US 2011/0243475 A1 Oct. 6, 2011

Related U.S. Application Data

(63) Continuation of application No. 11/095,479, filed on Apr. 1, 2005, now Pat. No. 8,184,923.

(30) Foreign Application Priority Data

Apr. 19, 2004 (JP) .................................. 2004-122618

(51) Int. Cl.
*G06K 9/42* (2006.01)
(52) U.S. Cl. ........ 382/257; 382/141; 382/149; 382/259; 382/264
(58) Field of Classification Search .................. 382/141, 382/149, 257, 294–297, 259, 264
See application file for complete search history.

(56) References Cited

U.S. PATENT DOCUMENTS

| | | | | |
|---|---|---|---|---|
| 5,202,749 A | * | 4/1993 | Pfister | 356/605 |
| 5,301,248 A | * | 4/1994 | Takanori et al. | 382/147 |
| 5,351,201 A | * | 9/1994 | Harshbarger et al. | 348/187 |
| 5,650,844 A | * | 7/1997 | Aoki et al. | 356/237.2 |
| 5,675,380 A | * | 10/1997 | Florent et al. | 348/251 |
| 5,696,550 A | | 12/1997 | Aoki et al. | |
| 5,764,209 A | | 6/1998 | Hawthorne et al. | |
| 5,880,814 A | | 3/1999 | McKnight et al. | |
| 5,917,935 A | | 6/1999 | Hawthorne et al. | |
| 5,982,946 A | | 11/1999 | Murakami | |
| 6,099,134 A | | 8/2000 | Taniguchi | |

(Continued)

FOREIGN PATENT DOCUMENTS

JP 08-029360 A 2/1996

(Continued)

OTHER PUBLICATIONS

Edge—curve fitting, Goshtasby et al., Elsevier, 0262-8856,1995, pp. 169-177.*

(Continued)

*Primary Examiner* — Jayesh A Patel
(74) *Attorney, Agent, or Firm* — Eric J. Robinson; Robinson Intellectual Property Law Office, P.C.

(57) ABSTRACT

The present invention provides an image analysis method and an image analysis program having a feature of carrying out a panel display quality evaluation at low cost and short time with relieved influence of moire by treating a value, which is obtained by recognizing a coordinate of a panel pixel in a shot image based on an image for detecting a coordinate and positional information thereof with high accuracy and by calculating average luminance by panel pixel unit based on a center position of a coordinate, as representative luminance in each pixel of the panel, in a panel evaluation method of shooting an image display panel with a digital camera.

34 Claims, 30 Drawing Sheets

U.S. PATENT DOCUMENTS

| | | | |
|---|---|---|---|
| 6,211,913 B1 * | 4/2001 | Hansen et al. | 348/239 |
| 6,215,895 B1 | 4/2001 | Sali et al. | |
| 6,219,460 B1 | 4/2001 | Tatsuta | |
| 6,483,537 B1 * | 11/2002 | Mayer et al. | 348/180 |
| 6,618,185 B2 * | 9/2003 | Sandstrom | 359/292 |
| 6,643,395 B1 * | 11/2003 | Okabe | 382/149 |
| 6,816,625 B2 | 11/2004 | Lewis et al. | |
| 6,831,995 B1 | 12/2004 | Asano et al. | |
| 6,983,067 B2 * | 1/2006 | Cox | 382/145 |
| 7,012,679 B2 | 3/2006 | Ujihara et al. | |
| 7,095,883 B2 * | 8/2006 | Safaee-Rad et al. | 382/141 |
| 7,102,673 B2 | 9/2006 | Kimura | |
| 7,113,210 B2 | 9/2006 | Bloom | |
| 7,308,157 B2 | 12/2007 | Safaee-Rad et al. | |
| 7,538,750 B2 * | 5/2009 | Kim et al. | 345/87 |
| 2002/0041383 A1 * | 4/2002 | Lewis et al. | 358/1.9 |
| 2002/0122123 A1 | 9/2002 | Kimura | |
| 2002/0157033 A1 | 10/2002 | Cox | |
| 2003/0210344 A1 * | 11/2003 | Bloom | 348/362 |
| 2003/0215129 A1 * | 11/2003 | Yang et al. | 382/149 |
| 2005/0030395 A1 * | 2/2005 | Hattori | 348/246 |
| 2005/0232476 A1 * | 10/2005 | Hayakawa et al. | 382/141 |

FOREIGN PATENT DOCUMENTS

| | | |
|---|---|---|
| JP | 08-327497 | 12/1996 |
| JP | 2000-105167 A | 4/2000 |
| JP | 2003-042900 A | 2/2003 |

OTHER PUBLICATIONS

Office Action (Application No. 200510065959.4) dated Jan. 9, 2009.

* cited by examiner

IMAGE ANALYSIS METHOD, IMAGE ANALYSIS PROGRAM AND PIXEL EVALUATION SYSTEM HAVING THE SAMES

BACKGROUND OF THE INVENTION

1. Field of the Invention

The present invention relates to an image analysis method, an image analysis program and a pixel evaluation system having the sames for evaluating an image display panel.

2. Description of the Related Art

Conventionally, there is a method for evaluating display by shooting a color liquid crystal panel with a CCD camera (Patent Document 1: Japanese Patent Laid-Open No. H8-327497). According to the Patent Document 1, when a color liquid crystal panel is shot with a CCD camera, a center coordinate, a leakage gray value in every pixel and a CCD element region covered with a pixel image are saved firstly. Then a white raster is formed on a color liquid crystal display panel to be examined and shot with a CCD camera. Correction processing is carried out for removing the leakage gray value from outputting in every pixel displayed to a sensor element surface of a CCD camera. Then, output of the sensor element covered with the pixel image is added as well as obtaining a correction gray scale and a correction gray scale in every pixel is obtained. The liquid crystal display surface is reconstructed from a center coordinate and a correction gray value in every pixel and a liquid crystal display image is expressed by binary with a threshold; and thus, a defect is detected.

When a digital camera with the use of CCD which has not much high resolution for a panel is employed to reduce the cost of a digital camera as typified by a CCD camera with the use of a CCD type sensor, a pixel pitch of a digital camera shifts to a pitch of a non-display area such as a black matrix existing between each pixel, of the panel; accordingly, moire (indicates a stripe design which does not exists under normal condition) is generated more intensively. And thus, display unevenness which is to be essentially evaluated becomes difficult to be distinguished. Especially, moire has significant effects on using a panel having low aperture ratio of a pixel. In addition, in the case where a shot image is displayed in a reduced-size on a display or printed in a reduced-size with a printer, moire appears more intensively since there are also influences of a pixel of the display and a dot of the printer.

To reduce the influences of moire, it is required to reconstruct an image by recognizing a center coordinate of each pixel with respect to a shot image with a digital camera with high accuracy and by calculating an average luminance value in each pixel unit. Note that a specific method for recognizing the pixel position of a panel is not mentioned in the description of evaluation equipment disclosed in the above Patent Document 1.

Alternatively, as a method for relieving moire, there is a method of blurring by defocusing when shooting with a digital camera or blurring a shot image using a software; however, a display defect portion such as a point defect is blurred and hard to distinguish since it is required to be blurred much intensively. Besides, display unevenness which is to be essentially evaluated is observed differently from the actual display unevenness.

Further alternatively, as a method for relieving moire, it is considered that there is a method of sufficiently increasing the number of pixels of a digital camera with respect to the number of pixels of a panel. However, it is difficult to manufacture a high-definition digital camera which has higher resolution than that of a high-resolution panel without lowering a dynamic range; and thus, it is required to employ a very expensive digital camera. Therefore, a method for relatively increasing pixel density of a digital camera by enlarging a part of a panel display surface and shooting at several times is employed. However, in this case, it takes extra effort and time to shoot, and besides, the size or cost of evaluation equipment increases when combined with an automatic stage. In addition, it takes long time to analyze various kinds of data after shooting since the size of image data after shooting is also greatly enlarged. Furthermore, even saving evaluation data takes time and consumes an enormous storage capacity of a recording medium.

SUMMARY OF THE INVENTION

It is an object of the present invention to provide a display quality evaluation system of an image display panel at low cost and short time with relieved influence of moire.

In view of the foregoing problem, one mode of the present invention is fixing an image display panel (hereinafter, also referred to as a panel) and a digital camera, shooting with the digital camera by displaying a fixed pattern to the panel, and recognizing a pixel coordinate of the panel based on the image shot with the digital camera.

Consequently, a center coordinate of each pixel can be obtained with high accuracy. Note that the term "pixel" in this specification denotes one dot of any of R, G and B in the case of a color panel using three colors of RGB.

Another mode according to the invention is fixing an image display panel and a digital camera, shooting with the digital camera by displaying a fixed pattern to the panel, recognizing a center coordinate of a pixel of the panel based on a first image shot with the digital camera, and calculating average luminance of each pixel to a second image shot with the digital camera.

Consequently, an image for integrating a pixel unit can be outputted with high accuracy without blurring a state of displaying a defect pixel between adjacent pixels. Furthermore, a fixed size of an image for integrating each of pixel unit having no rotational shift can be outputted constantly even in the case where the shift of size of an image for being evaluated or a rotational shift is generated.

Another mode according to the invention is fixing an image display panel in which non-display area regularly exists between pixels and a digital camera, shooting with the digital camera by displaying a fixed pattern to the panel, recognizing a center coordinate of a pixel of the panel based on a first image shot with the digital camera, and outputting an image for integrating a pixel unit with reduced influence of moire due to the non-display area by calculating average luminance of each pixel to a second image shot with the digital camera based on the center coordinate to be luminance in each pixel of the second image.

According to the invention, in the case of recognizing a pixel coordinate of a panel in an image shot with the digital camera, a center coordinate of a pixel of a panel may be recognized as follows: an image in which display in a state of inputting an image signal of an entire non-display in the panel is shot with the digital camera is set as a background image, then difference process is carried out to a first image shot with the digital camera by using the background image. Consequently, a frequency of misrecognizing a pixel coordinate of a panel can be reduced since a position can be recognized after eliminating the influence of a display defect even in the case where a pattern due to a display defect is appeared.

According to the invention, in the case of recognizing a pixel coordinate of a panel in an image shot with the digital camera, a center coordinate of a pixel of a panel may be recognized by using an approximated curve due to an arbitrary function. Consequently, a pixel coordinate of a panel can be recognized with higher accuracy even in the case where a horizontal shift is generated between a panel display surface and the digital camera or the case where an overall or partial distortion is generated in a lens of the digital camera when shooting in fixing the panel and the digital camera.

According to the invention, a first image for integrating a pixel unit may be formed from the first image,
a second image for integrating a pixel unit may be formed from a third image shot by being fixed so as to shift from the first image,
and difference process may be carried out for the first image for integrating a pixel unit and the second image for integrating a pixel unit.
Consequently, for example, an appear or disappear defect before and after a reliability test can be counted since the difference of an image for being evaluated can be detected as the difference of luminance for integrating a pixel unit.

According to the invention, the image for integrating a pixel unit may be formed by integrating and averaging an image included in the range of a predetermined distance from the center coordinate of the pixel.
Consequently, an average luminance by the pixel unit of the panel corresponding to an aperture of the pixel of the panel can be calculated.

According to the invention, a predetermined threshold to luminance which indicates a boundary between a normal pixel and a display defect pixel may be set to the second image when an image display panel has a display defect pixel, the number of display defect pixels may be counted with the threshold, ratio of a display defect pixel to a normal pixel in a localized region, the size of the display defect pixel, or the shape of the display defect pixel may be classified when the display defect pixel locally exists, and the number of pieces may be counted every ratio of the display defect pixel in a local region, the size of the display defect pixel, or the shape of the display defect pixel. At this time, counting in the local region is carried out separately from the number of display defect pixels. Consequently, one or a plurality of a point defect which is isolated (isolated point defect), a collection of point defects (point defect group), a whole line defect (whole line defect) and an unwhole line defect (unwhole line defect) can be counted individually with sensitivity which is arbitrarily set.

According to the invention, a result of counting the number of defects every ratio of the display defect pixel, the size of the display defect pixel, or the shape of the display defect pixel may be outputted with a pixel coordinate. Consequently, a pixel coordinate can be identified firstly when a pixel of certain defect level is confirmed with an optical microscope; therefore, a location of a pixel coordinate can be quickly specified.

According to the invention, an image in which a defect pixel detected by every threshold is separated by color may be outputted. As a result, whether which part in the panel display surface the defect of each level appears can be visually and easily judged.

According to the invention, in the case where the panel has the display defect pixel, a position of a display defect pixel and image data of the display defect pixel in a second image shot by the digital camera may be saved, the display defect pixel may create a blurred image before replacing image data of a peripheral non-defect pixel, and image data of the display defect pixel may be overwritten in a position of the display defect pixel to a blurred image.
Consequently, an image can be blurred other than display defect portion without blurring display defect portion.

According to the invention, processing from blurring to enhancing contrast may be carried out with a series of operations in the case where a contrast enhancing process is carried out to a blurred image. Consequently, a smoother image can be obtained after enhancing contrast.

According to the invention, processing for integrating a pixel unit may be carried out by separating a second image in each element of RGB colorimetric system, XYZ colorimetric system or other colorimetric system in the case where the image display panel is shot with a digital camera for color and is set as a second image of the panel.
Consequently, analysis can be carried out as a color image by carrying out a pixel unit processing according to each element of certain colorimetric system and by finally combining each element.

According to the invention, a second image may be corrected so that a median of luminance distribution in the second image shot with the digital camera or a threshold may be corrected according to ratio of a median and a predetermined value of luminance in the second image before counting a display defect.
Consequently, sensitivity of defect level can be corrected to a certain standard even in the case where average luminance of a shot image is different according to a difference of a panel display state or a shooting condition with a camera; therefore, a result of counting a defect can be compared more precisely.

In addition, a consecutive process may be carried out from recognition of a center coordinate of a pixel to an image analysis by listing the combination of a first file in which information related to an image display panel is written, a second file in which information related to a first image is written, a third file in which information related to a third image is written and a fourth file in which analysis condition in one or more of the above image analysis methods. Consequently, a large number of files can be smoothly processed.
Consequently, a large number of files can be smoothly processed.

Note that a case of using a digital camera as an appliance for shooting for evaluating display quality of an image display panel is described; however, MOS type sensor, CCD type sensor or the like can be employed for a digital camera. Moreover, a digital camera at low cost can be also employed.

According to the invention, a panel display quality evaluation system having a feature of possessing an image analysis method can be also provided.

Furthermore, according to the invention, an image analysis program for performing the image analysis method can be provided. For example, an image display panel is shot with a digital camera, and an image analysis program for serving a computer for analyzing the image shot with the digital camera as a recognizer for a pixel coordinate of the panel based on the image shot with the digital camera, a calculator for average luminance of each pixel unit of the panel based on the pixel coordinate and outputter of an image in which a value of calculated luminance for integrating a pixel unit is set to as luminance in each pixel of the panel can be provided.

According to the invention, a panel can be evaluated in a state that moire which is problematic in the case of shooting a state of displaying of a panel in which a non-display region between pixels exists with a digital camera is eased or reduced.

Moreover, according to the invention, evaluation equipment and evaluation system at low cost can be provided since a digital camera with very high resolution is not required and a digital camera with a certain level of resolution may be employed.

Furthermore, according to the invention, a processing can be carried out at short time since an entire panel can be shot and evaluated at once.

These and other objects, features and advantages of the present invention will become more apparent upon reading of the following detailed description along with the accompanied drawings.

DETAILED DESCRIPTION OF THE INVENTION

Figure 1:
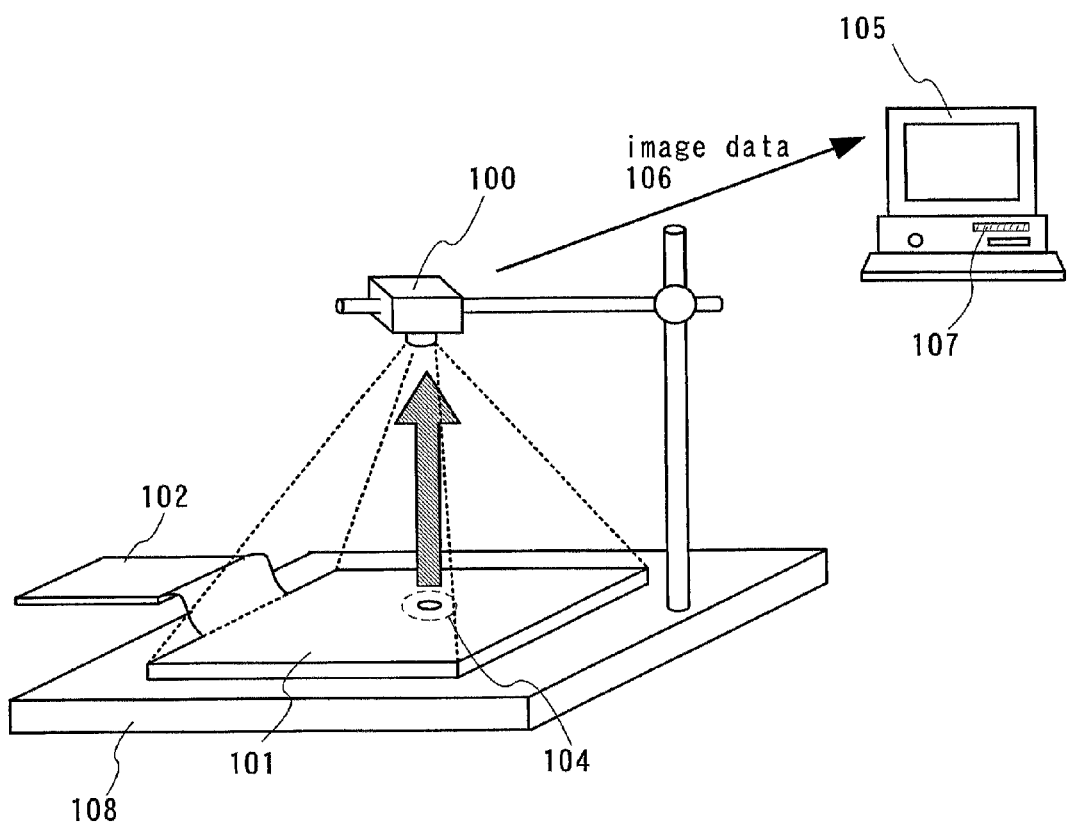
FIG. 1 is a view showing panel evaluation equipment according to the present invention.

Embodiment modes according to the present invention are described in detail with reference to the drawings. It is easily understood by those who are skilled in the art that embodiments and details herein disclosed can be modified in various ways without departing from the purpose and the scope of the present invention. Therefore, it should be noted that the description of embodiment modes to be given below should not be interpreted as limiting the present invention. Further, in constitutions according to the present invention to be described below, similar parts among different drawings are marked in common with the same reference numerals.

Embodiment Mode 1

In this embodiment mode, a specific method for analyzing an image is described.

First, the followings are set firstly: specification (hereinafter, referred to as a panel specification file) related to a panel such as the number of pixels and the state of an RBG sequence; the condition of a regular fixed pattern image (hereinafter, referred to as a pattern), for example, the condition such as a lattice interval, the number of the lattices and a coordinate of a first line of the lattice in the case of a pattern having a lattice design; specification (hereinafter, referred to as a lattice specification file) related to an image for carrying out detecting a coordinate (hereinafter, referred to as an image for detecting a coordinate); and specification (hereinafter, referred to as an analysis specification file) related to an image analysis such as a threshold of each defect. Then, these are reserved in a file (ex. text file).

Next, as shown in FIG. 1, a digital camera 100 and an object for evaluation, namely a panel 101, are fixed to a stage 108 so that the display state of a panel can be shot with the digital camera. The digital camera 100 preferably has resolution several times higher than that of the panel 101. The panel is connected to a driver circuit 102 so as to control a display image, namely a pattern. Then, image data 106 shot with the digital camera 100 is inputted to an information processor 105, for example, a computer. In the case of shooting a plurality of panels in this state, the panel and the digital camera are preferably fixed to each other so as not to move until a series of shooting panel is finished. Note that the computer is provided with a recording medium 107 in which a pixel analysis program is recorded.

Figure 2:
FIG. 2 is an entire black image shot in the invention.
Figure 3:
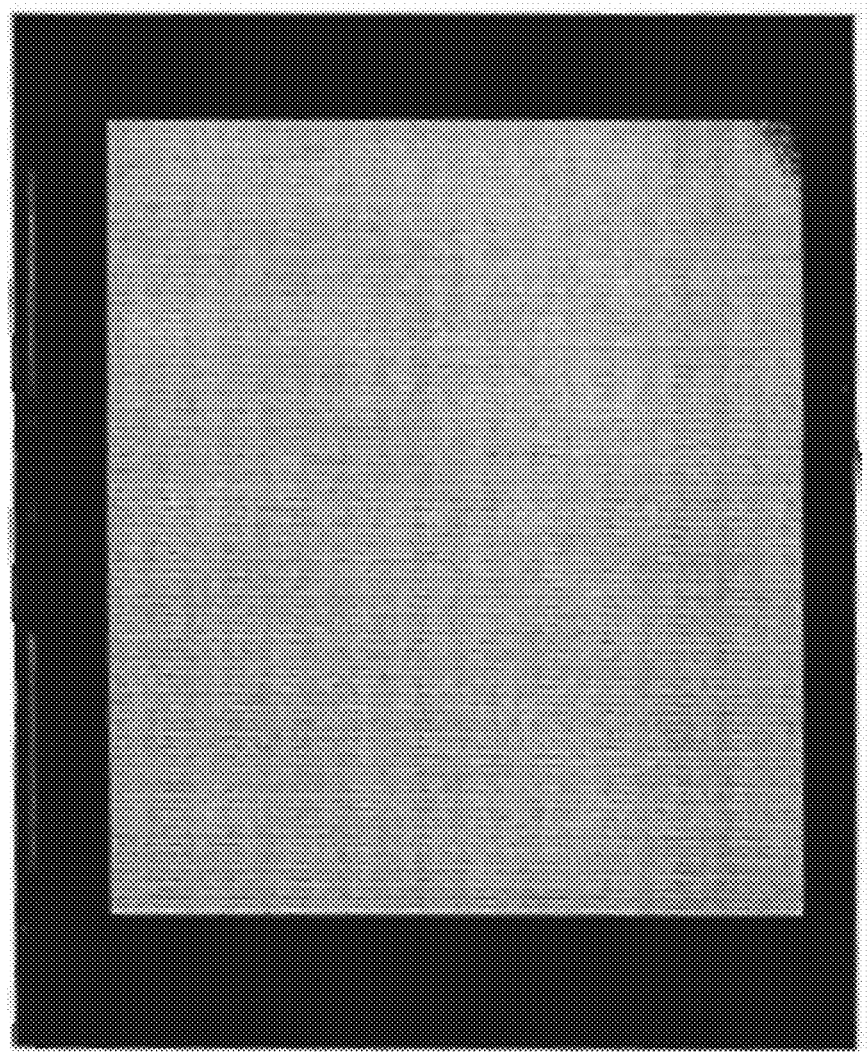
FIG. 3 is an entire white image shot in the invention.

Next, an image to be evaluated, which has one color entirely so as to identify readily a poor or defect element 104 or display unevenness, is displayed to shoot with the digital camera 100 as an image to be evaluated. In the case of evaluating a defect of a bright spot, an image for being evaluated of a panel may be displayed in a black color entirely (an entire black image), for example, as shown in FIG. 2. Further, in the case of evaluating a defect of a blind spot or display unevenness of a panel of a light emitting device, an image for being evaluated of a panel may be displayed in a white color entirely (an entire white image), for example, as shown in FIG. 3. Note that the panel is a panel for displaying a green color entirely; however, an image when the entire surface is displayed is referred to as a white color panel as a matter of convenience. In the case of saving the image for being evaluated, lossy compression which degrades the image quality is not preferably carried out; however, lossy compression may be carried out to save because of low impact when a compression method of low compression rate is employed.

Figure 4:
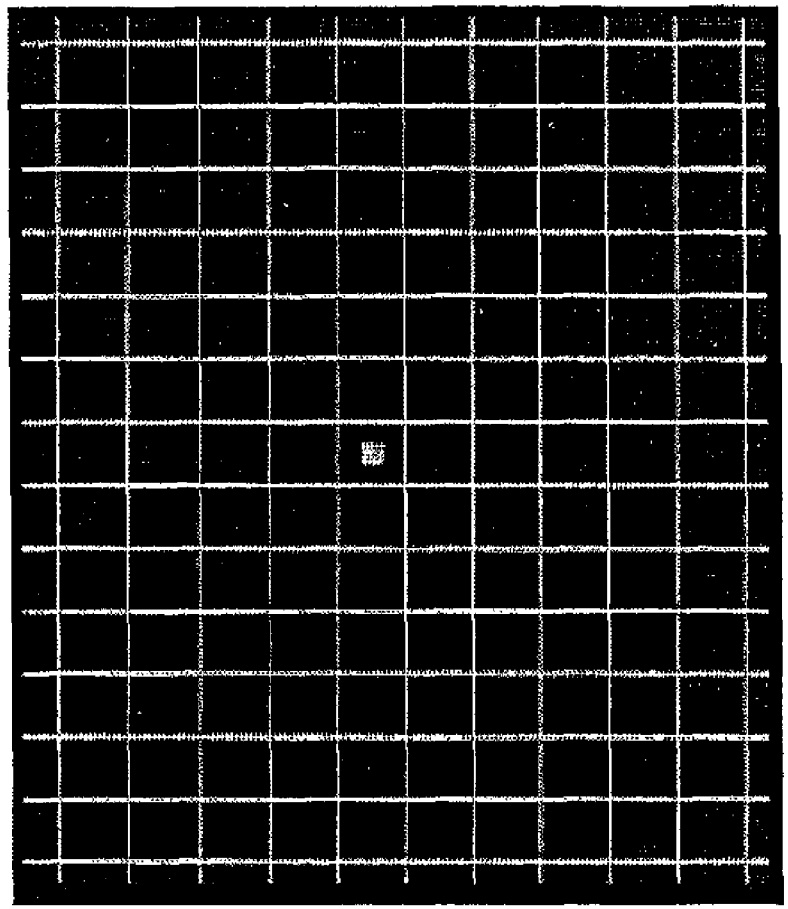
FIG. 4 is an image for detecting a coordinate shot in the invention.

The digital camera 100 and the panel 101 are fixed so as not to move the position, then, the image of the panel is displayed by switching to a pattern such as a lattice design and shot with the digital camera 100 as an image for detecting a coordinate, as shown in FIG. 4. In the case of saving the image for detecting a coordinate, lossy compression which degrades the image quality is not preferably carried out; however, the lossy compression may be carried out to save because of low impact when a compression method of low compression rate is employed.

Note that either the image to be evaluated or the image for detecting a coordinate may be shot firstly.

Then, data 106 of the image for being evaluated and the image for detecting a coordinate is transferred to the computer 105 serving as an information processor.

Next, a pixel analysis program for functioning the computer 105 serving as an information processor is ran to select the panel specification file, the lattice specification file and an image file for detecting a coordinate. Then, the lattice position of the image file for detecting a coordinate is determined by a series of image processing to output the result as a coordinate data file. The above image processing is carried out as follows: binarizing; thinning; obtaining a center with horizontal dilation; combining; re-calculating a center position of each line with floating-point operation considering peripheral data; fitting by an arbitrary function in a unit of each line of a lattice with a least-square method; or the like. For example, a horizontal shift between the digital camera and the surface of a panel display or distortion of an optical system of the digital camera can be recognized with high accuracy by approximating to a curve such as a quadratic function.

Note that the image processing is described in detail in Embodiment Mode 2.

When a number of display defects are seen in the image for detecting a coordinate, an entire white or entire black image is shot as a background image thereof (an image in which a display in a condition of inputting picture signal of an entire non-display is shot with a digital camera) to suppress an influence of a display defect with a difference process between the background image and the image for detecting a coordinate before a processing for detecting a lattice position to the image file for detecting a coordinate.

Subsequently, the coordinate data file outputted as above, the image file for being evaluated shot as above, and the analysis specification file prepared as above are selected. Then, a processing for integrating a pixel unit is carried out by a method written in the analysis specification file. In the processing for integrating a pixel unit, a center coordinate of each pixel is calculated from the coordinate data file, then, an average value of luminance of a pixel unit is calculated from integrating image data of an arbitral method and an arbitral range based on a center coordinate thereof. For example, a value in which luminance of pixel unit is averaged is calculated by integrating image data up to a boundary between each pixels.

Figure 5:
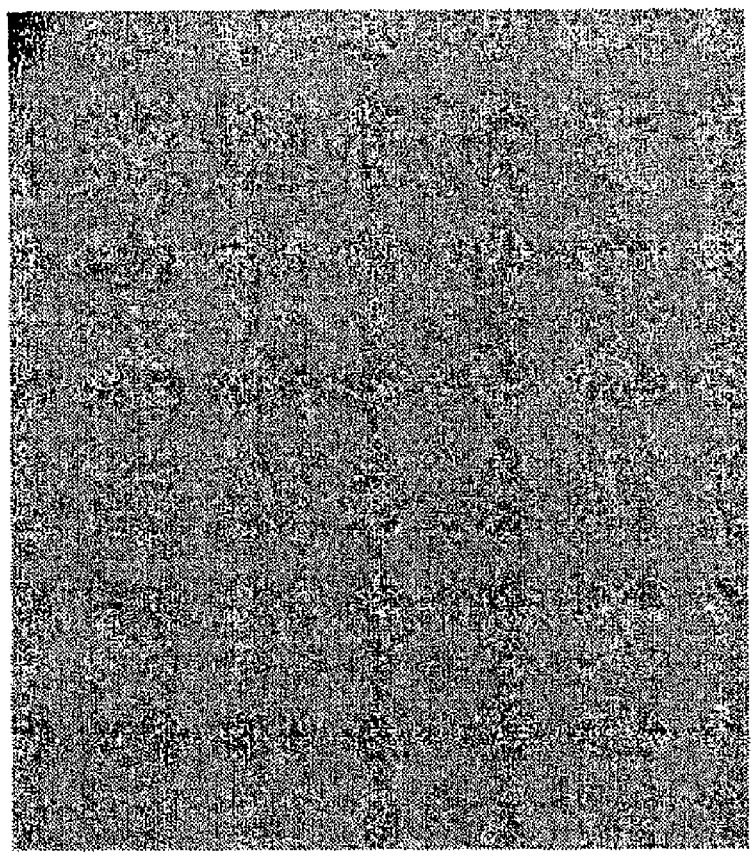
FIG. 5 is an image that a processing for integrating a pixel unit, adjusting aspect ratio and the like are carried out to an entire white image in the invention.

When the above processing for integrating a pixel unit is completed, the result can be outputted as an image for integrating a pixel unit, for example, as a bitmap format of 256 (8-bit) tones. At this time, integral multiplication of aspect ratio of an image is preferably carried out in a longitudinal or horizontal direction as shown in FIG. 5 so as to be close to aspect ratio of an actual panel.

Based on a condition (threshold) to assume a pixel defect written in the analysis specification file, the number of defect pixels is counted from the image outputted by the processing for integrating a pixel unit. In other words, an image analysis program can make a computer function as a counter of the number of display defect pixels by using a threshold. Furthermore, a point defect group and a line defect group can be counted by type of each defect by separately setting the point defect group and the line defect group by ratio of a defect pixel (ratio of a local defect pixel to a normal pixel, namely ratio in the local range in the case where a defect pixel is locally generated), a size thereof, a shape thereof or the like. For example, the defects can be set as follows: a point defect group when point defects exist more than 30% in all pixels in an area surrounded by a rectangle having an arbitrary size; a whole line defect when point defects exist more than 95% in all in one line of a pixel of a vertical direction or a horizontal direction; and an unwhole line defect when point defects exist more than 20%. In addition, a separately counted pixel defect which is not applied to the above type of defects can be calculated as the number of the isolated point defect. The counting result can be outputted by type of a defect as a view format of a coordinate and a defect level (hereinafter, referred to as a defect coordinates file) and a list format in which only the number of counted defects is listed (hereinafter, referred to as a log form file), for example, as text data.

Note that, when evaluating the increase and the decrease of defects before and after a reliability test, an appear or disappear defect can be individually evaluated by a difference process of an image for integrating a pixel unit before and after the test even in the case where the fixing state of the panel and the digital camera is shifted before and after the test.

Figure 6:
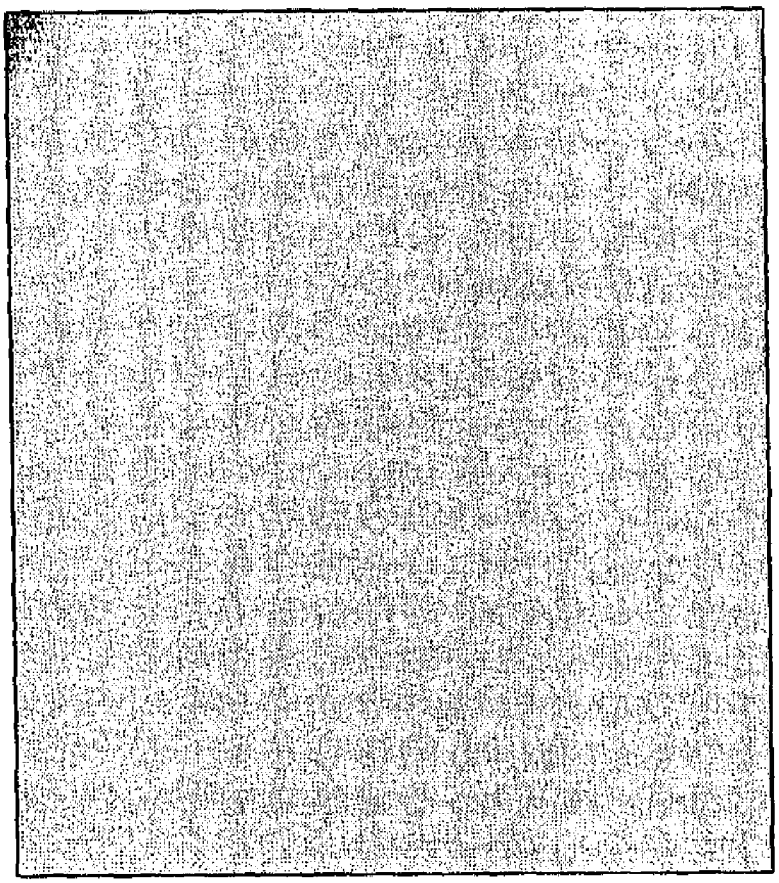
FIG. 6 is an image of defect point form (image for integrating a pixel unit) of a panel according to the invention.
Figure 7:
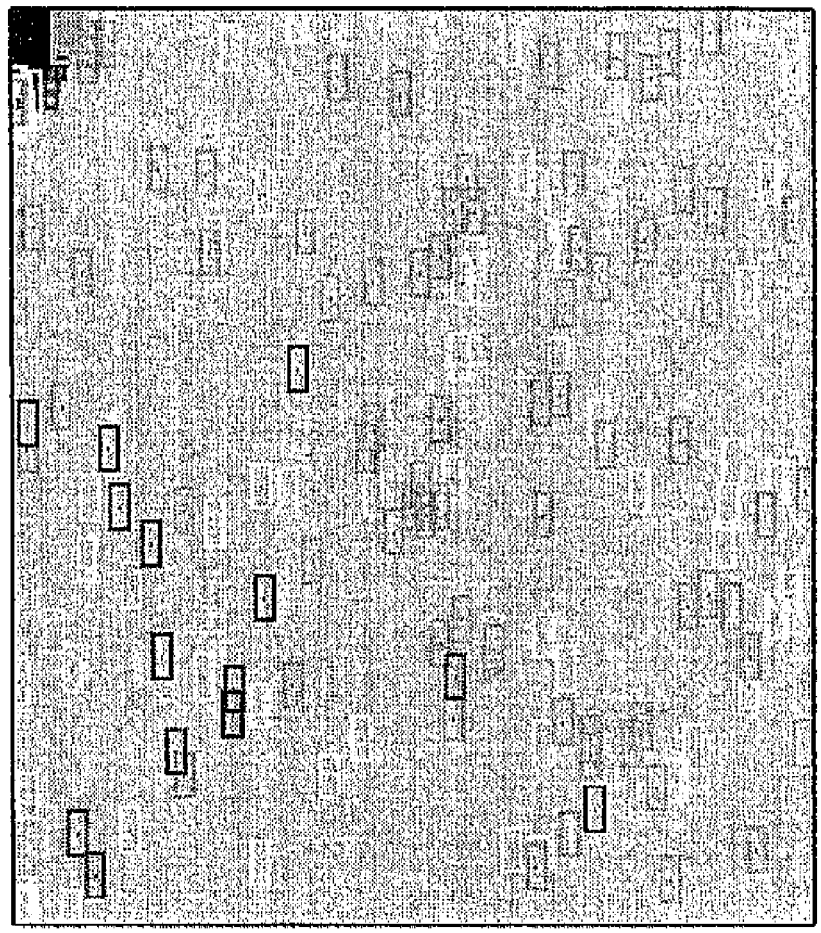
FIG. 7 is an image of a defect mark form of a panel according to the invention.
Figure 8:
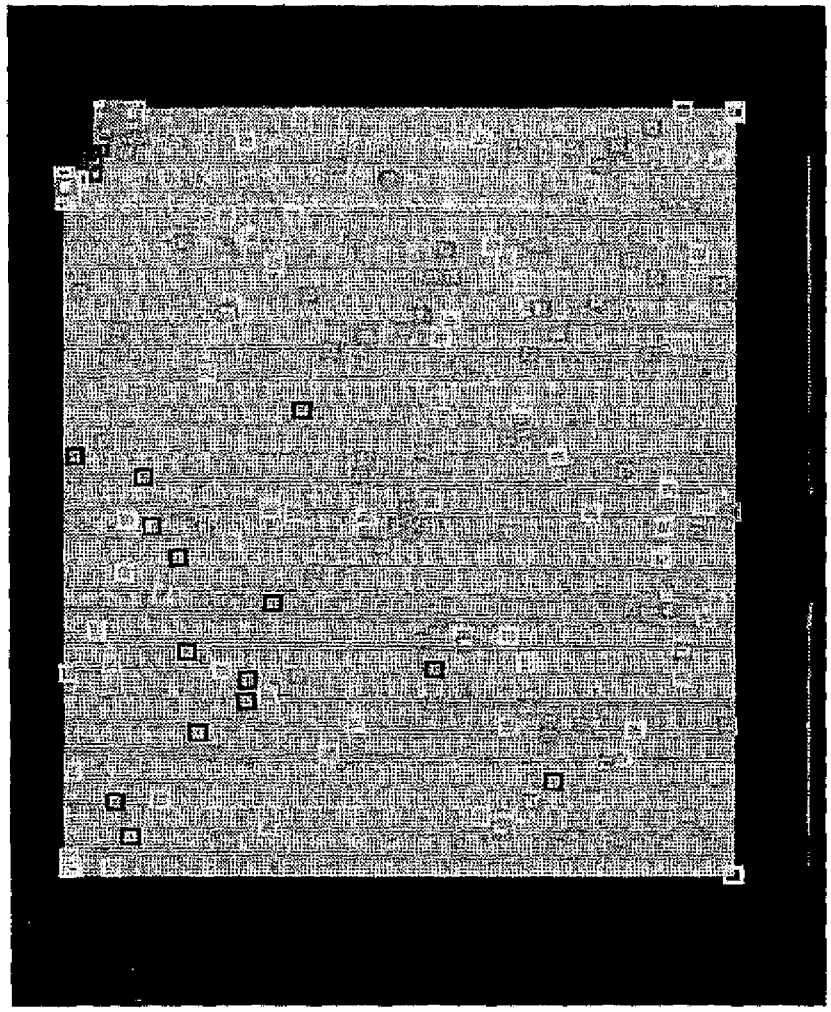
FIG. 8 is an image of a defect mark form of an entire white image according to the invention.

If required, an image of defect point form in which a defect portion is filled completely as shown in FIG. 6 or an image of a defect mark form in which a square marking is attached around a defect portion as shown in FIG. 7 can be outputted by separating a defect portion by color in every level. Alternatively, as shown in FIG. 8, a defect marking can be directly put in an image for being evaluated. In the case where the point defect group and/or the line defect are separately set among the display defect, a kind of defect can be readily grasped visually by using more different color or different mark.

Moreover, the defect can be outputted as the log file by calculating luminance median and standard deviation in an entire of the display area of the panel, and further, standard deviation showing dimension of display unevenness having a stripe shape of a vertical direction or a horizontal direction in the surface.

At this time, display unevenness of a vertical direction or a horizontal direction can be evaluated. For example, degree of display unevenness of a horizontal direction can be represented by calculating an average value for every pixel line unit of a perpendicular direction and by calculating standard deviation thereof assuming that is the same as the variation of the average value.

Furthermore, to the an image for integrating a pixel unit, a defect portion can be filled and blurring can be performed based on a setting to blurring written in an analysis specification file, and further, an image in which a defect portion is overwritten can be outputted to the blurred image. For example, a general lowpass filter can be used for blurring itself. A blurred image is referred to as a moire-erased image.

Figure 9:
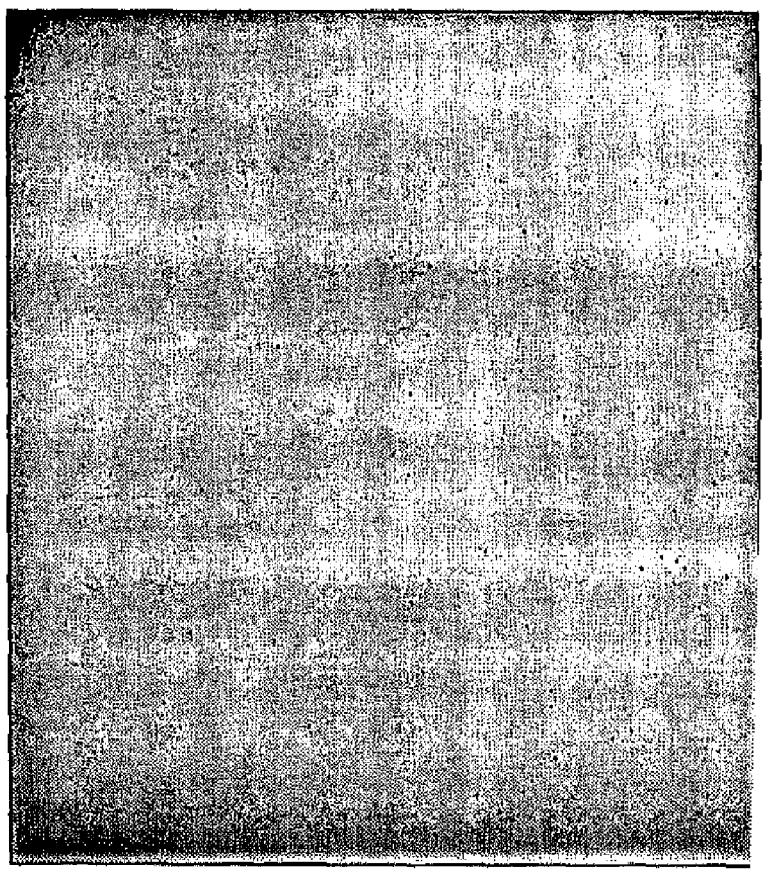
FIG. 9 is a moire-erased image of an entire white image according to the invention.

Moreover, in the case of making original display unevenness be enhanced by a contrast enhancing process, the contrast enhancing process is carried out as the series of floating-point operation from blurring, and a moire-erased and contrast-enhanced image as shown in FIG. 9 can be outputted by finally degrading to a bitmap gray scale image of 256 tones.

Note that a panel can be evaluated with a digital camera for color. For example, when shooting an image for panel display, a processing may be carried out by extracting only luminescence data if it is not required to evaluate a hue of a panel which is an object for evaluation.

On the other hand, when shooting an image for panel display with a digital camera for color, the above-mentioned processing for integrating a pixel unit of every element of an RGB colorimetric system, XYZ colorimetric system or other type of colorimetric system is carried out if it is required to evaluate a hue, and each element value may be transformed as a color image when outputting an image after various processing. For example, in the case of using an RGB colorimetric system, the processing for integrating a pixel unit is carried out to each element value of an RGB colorimetric system, so display defect can be carried out from contrast enhancing process and blurring. In the case of outputting a bitmap image with an RGB colorimetric system, so display defect can be carried out from contrast enhancing process and blurring. In the case of outputting a bitmap image with an RGB colorimetric system, each element value of an RGB colorimetric system may be directly outputted. Moreover, each element value may be corrected before the processing for integrating a pixel unit so that a median of each element value becomes a fixed value or a predetermined value. Accordingly, the need to provide a threshold of a defect level for each element value can be eliminated even in the case where a median of every element value is greatly different. When an image is outputted after various processing, a hue can be returned to a condition of an early stage by dividing the each element value by the correction value.

In addition, a consecutive process may be carried out from recognition of a center coordinate of a pixel by listing the combination of a first file in which information related to a panel is written, a second file in which information related to an image for being evaluated is written, a third file in which information related to an image for detecting a coordinate is written and a fourth file in which analysis condition in one or more of the above image analysis methods. Consequently, a large number of files can be smoothly processed.

As described above, an image shot with a digital camera can be outputted as an image for integrating a pixel unit by analyzing. And thus, display unevenness and a display defect of an original panel can be evaluated by being distinguished from moire. Furthermore, according to the invention, a moire-erased image which is closer to an actual panel display can be outputted and a display defect can be counted with high accuracy even in the case of using a digital camera having not so much high resolution. Accordingly, a display quality evaluation system of an image display panel at low cost and high performance can be provided.

In this embodiment mode, a case that each pixel in a panel has a rectangular shape is described; however, the invention is not limited to this, and can be applied to a panel having a unique shape, for example, a pixel having a circular shape.

Embodiment Mode 2

In this Embodiment Mode, the details of an image processing in Embodiment Mode 1 are described with a flowchart shown in FIGS. 10 to 15.

Figure 16:
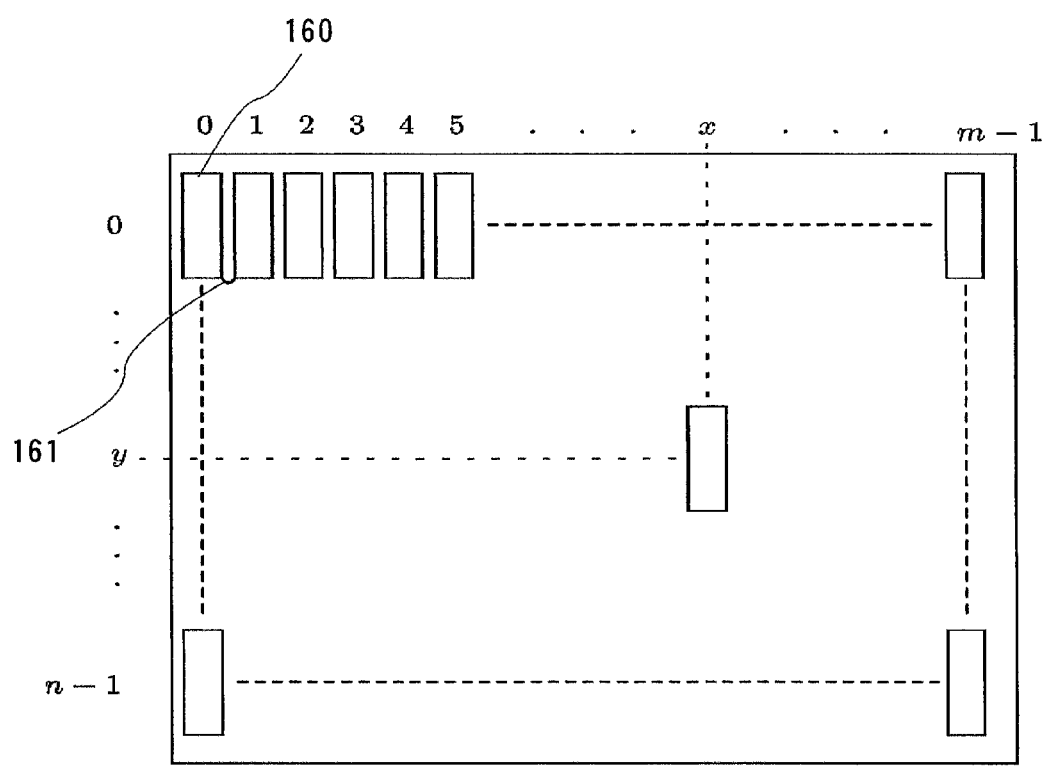
FIG. 16 is a schematic view of a pixel arrangement in a panel according to the invention.
Figure 18:
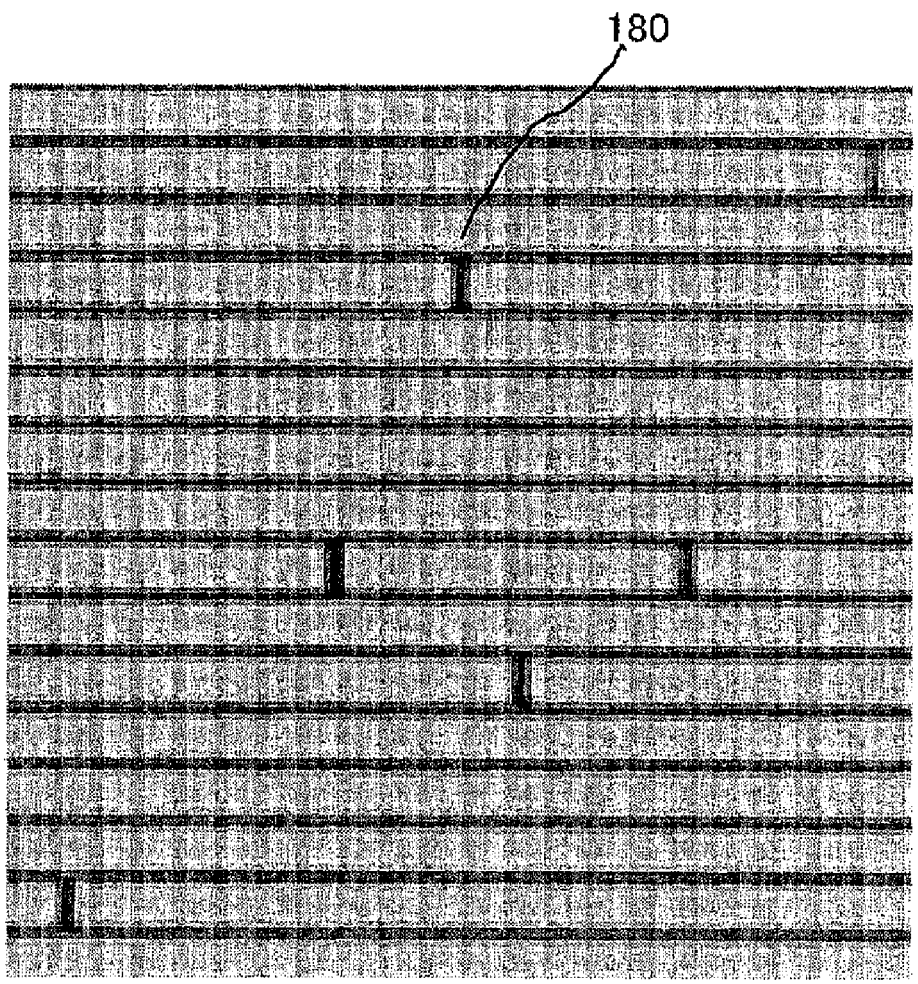
FIG. 18 is a partly enlarged image of an entire white image which is shot according to the invention.

FIG. 16 schematically shows a pixel arrangement of each R, G and B in a panel, and each of the pixel is arranged so that m piece of pixel is arranged in x direction and n piece of pixel is arranged in y direction, and each non-display area 161 exists regularly between the pixels. FIG. 18 shows an image in which an image for being evaluated actually shot is partly enlarged. In this image, six pieces of a poor pixel 180 are observed.

Figure 10:
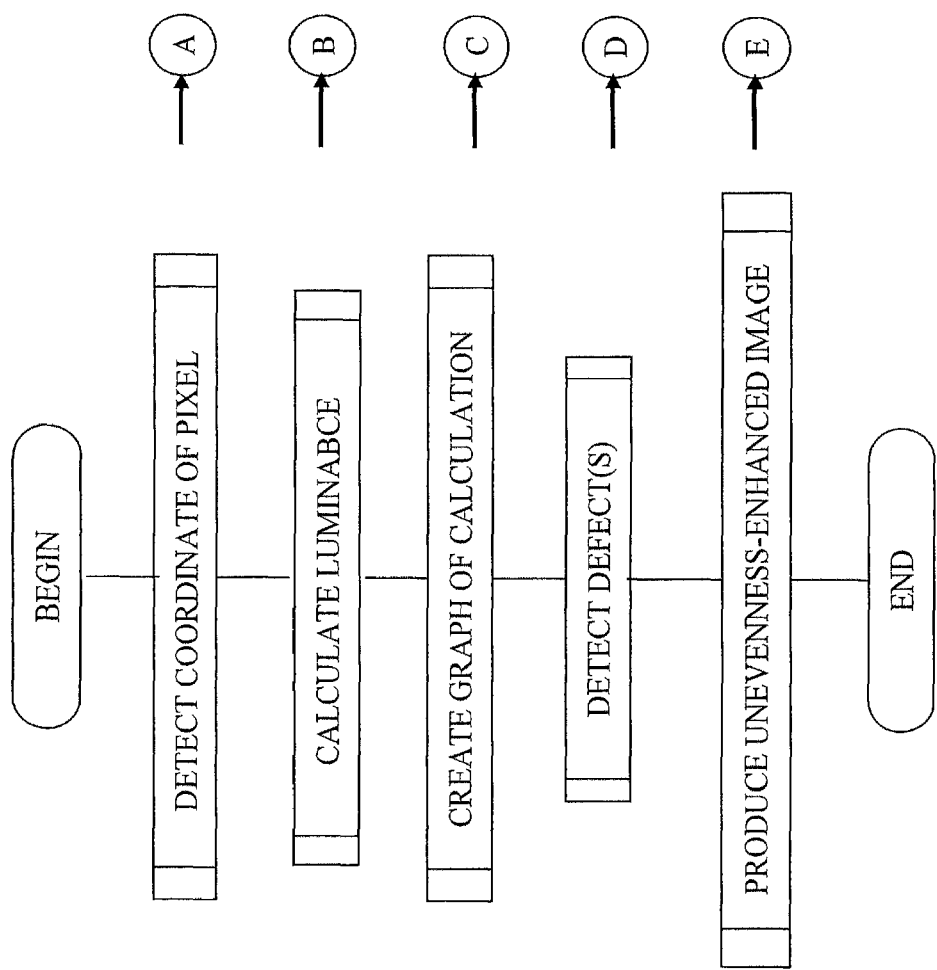
FIG. 10 is a flowchart showing image processing (entire flow) according to the invention.

A brief description of an image processing shown in this Embodiment Mode is as follows: a coordinate of a pixel of a panel is detected; luminance calculated; graph of the result of calculation is created; a defect is detected; and an image in which display unevenness is enhanced is produced, as shown in FIG. 10.

Hereinafter, each processing is described in detail.

Figures 11A, 11B:
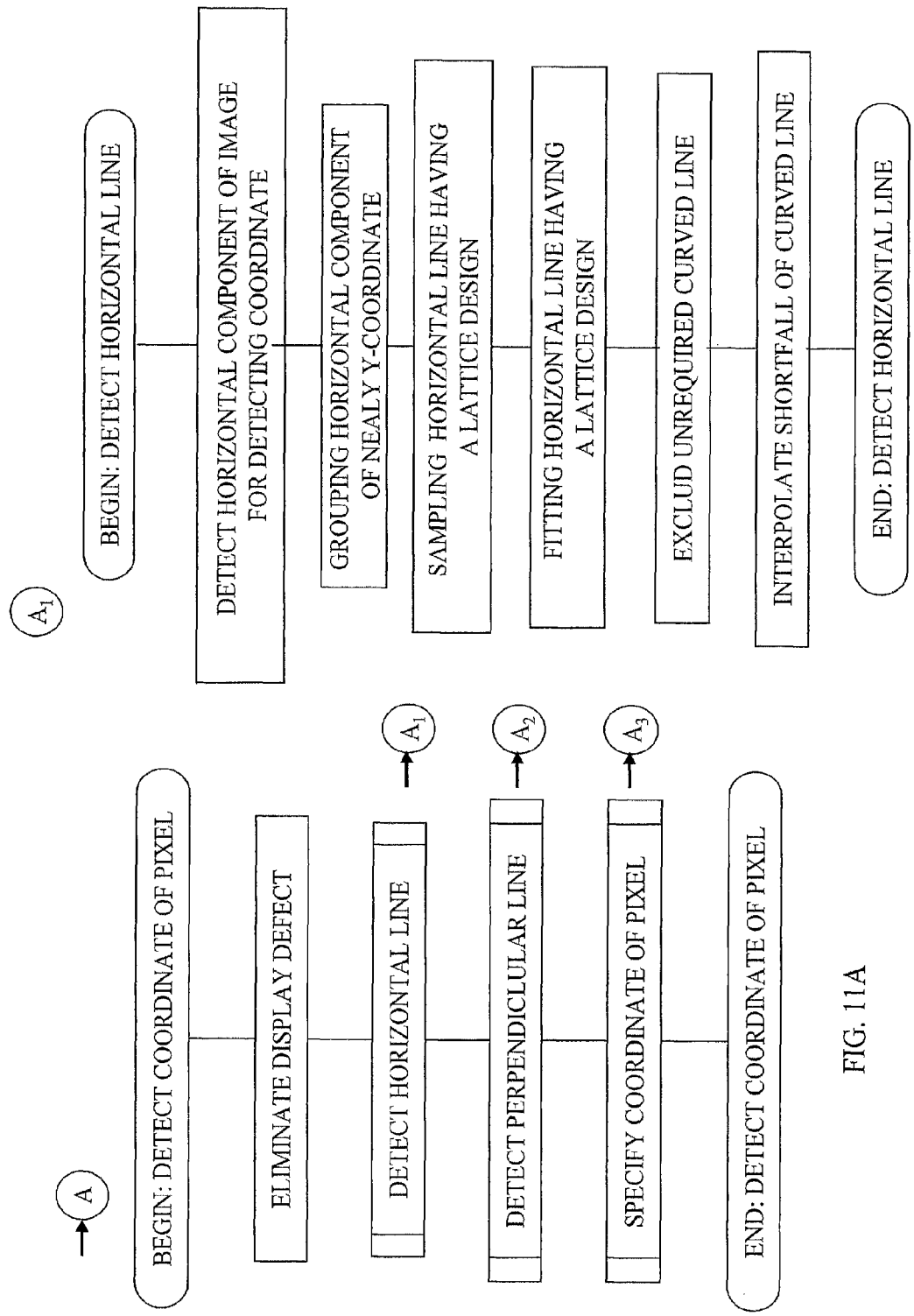
FIG. 11A to 11D are flowcharts showing image processing (coordinate detection flow) according to the invention.

To detect a coordinate, an entire black image is used as a background image, and a display defect is eliminated by subtracting the entire black image from an image for detecting a coordinate, as shown in FIG. 11A. However, the processing for eliminating a display defect can be omitted in the case where a display defect has a small influence on coordinate detection.

Then, detecting a horizontal line of a panel (hereinafter, referred to as horizontal line detection) and detecting a perpendicular line of the panel (hereinafter, referred to as perpendicular line detection) are carried out with respect to an image for detecting a coordinate shown in FIG. 4, and then, specifying a pixel coordinate of the panel in the image is carried out based on information on the detection. Specifying a pixel coordinate can be carried out by procedure of binarizing, thinning and obtaining a center with horizontal dilation.

Note that either horizontal line detection or perpendicular line detection may be carried out firstly.

Hereinafter, horizontal line detection (A1), perpendicular line detection (A2) and a coordinate specification (A3) are described.

The horizontal line detection is completed by carrying out the following steps as shown in FIG. 11B: detecting a horizontal component of an image for detecting a coordinate; grouping the horizontal component; sampling a horizontal line having a lattice design; fitting the horizontal line having a lattice design, namely approximating with a curved line such as a quadratic function (curve approximation); excluding an unrequired curved line; and interpolating a shortfall of a curved line. Note that the detecting a horizontal component can be realized by carrying out binarization, thinning, and dilation (horizontal dilation). One horizontal line of a lattice pattern is divided into a plurality of short horizontal lines. The short horizontal segments are sequentially followed and grouped to distinguish other horizontal line having a lattice design. Note that the term "horizontal component" denotes a divided horizontal segments. The detected horizontal component shows a brief position of a horizontal line having a lattice design. A center position of a horizontal line is calculated from luminance distribution of an image of a horizontal line in an image for detecting a coordinate based on a coordinate of the brief position, and curve approximation is carried out by the unit of a group of the horizontal components, namely by the unit of one horizontal line of a lattice design. At this time, a group of only noise components of an image shows curve parameter having an obviously different tendency from that of a normal group; therefore, the group is deleted. A case of terminating the processing for grouping the horizontal component in a state that the number of horizontal lines is insufficient is conceivable since a line of a lattice is eliminated with the processing for eliminating a display defect. However, the insufficient horizontal lines can be formed from parameter of the approximated curve of the detected group of the horizontal components with interpolation or extrapolation in a position where the line of a lattice is thought to be eliminated compared with each interval of the group of the horizontal components which can be detected.

Note that there is a case that a horizontal component can not be normally detected since a line of a lattice has a dashed shape depending on a shape of a pixel or a shooting condition; however, in this case, detection can be normally carried out by turning a dashed line to a continuous line with the dilation to an image for detecting a coordinate before detection.

Figures 11C, 11D:
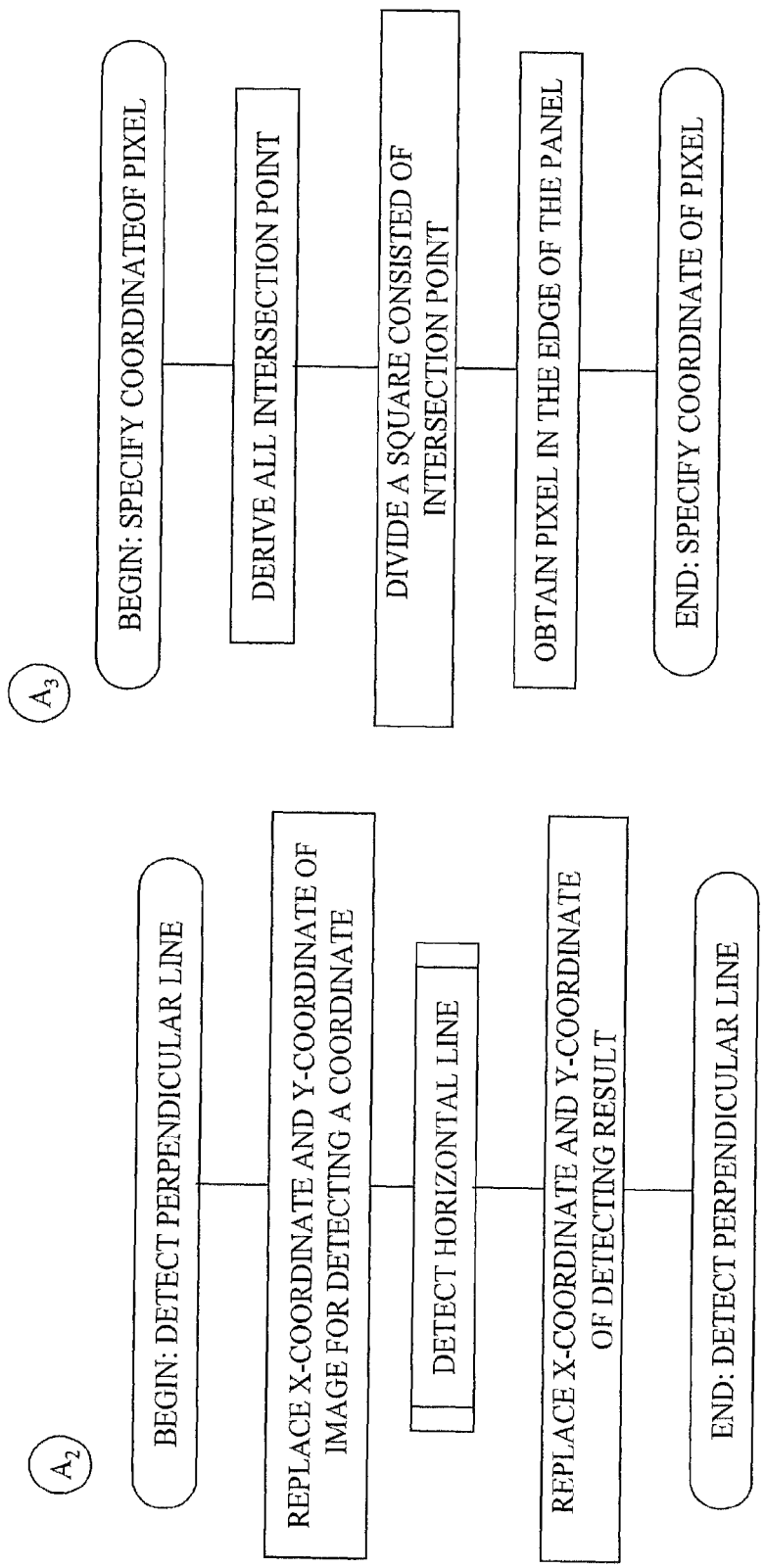

Detection algorithm of a horizontal line can be diverted to the detection of a perpendicular line as shown in FIG. 11C; therefore, the detection of a perpendicular line is completed through the following steps: replacing an x-coordinate and a y-coordinate of an image for detecting a coordinate; detecting a horizontal line as above; and replacing an x-coordinate and a y-coordinate of the detected result.

Furthermore, specifying a coordinate is completed through the following steps as shown in FIG. 11D: deriving all intersection points of a parallel line and a perpendicular line; specifying a pixel coordinate of the inside by equally dividing a square composed of the intersection points by the number of pixels included in a frame of the lattice; and obtaining a pixel coordinate in the edge of a panel display area from the pixel coordinate of the inside with extrapolation.

Figure 12:
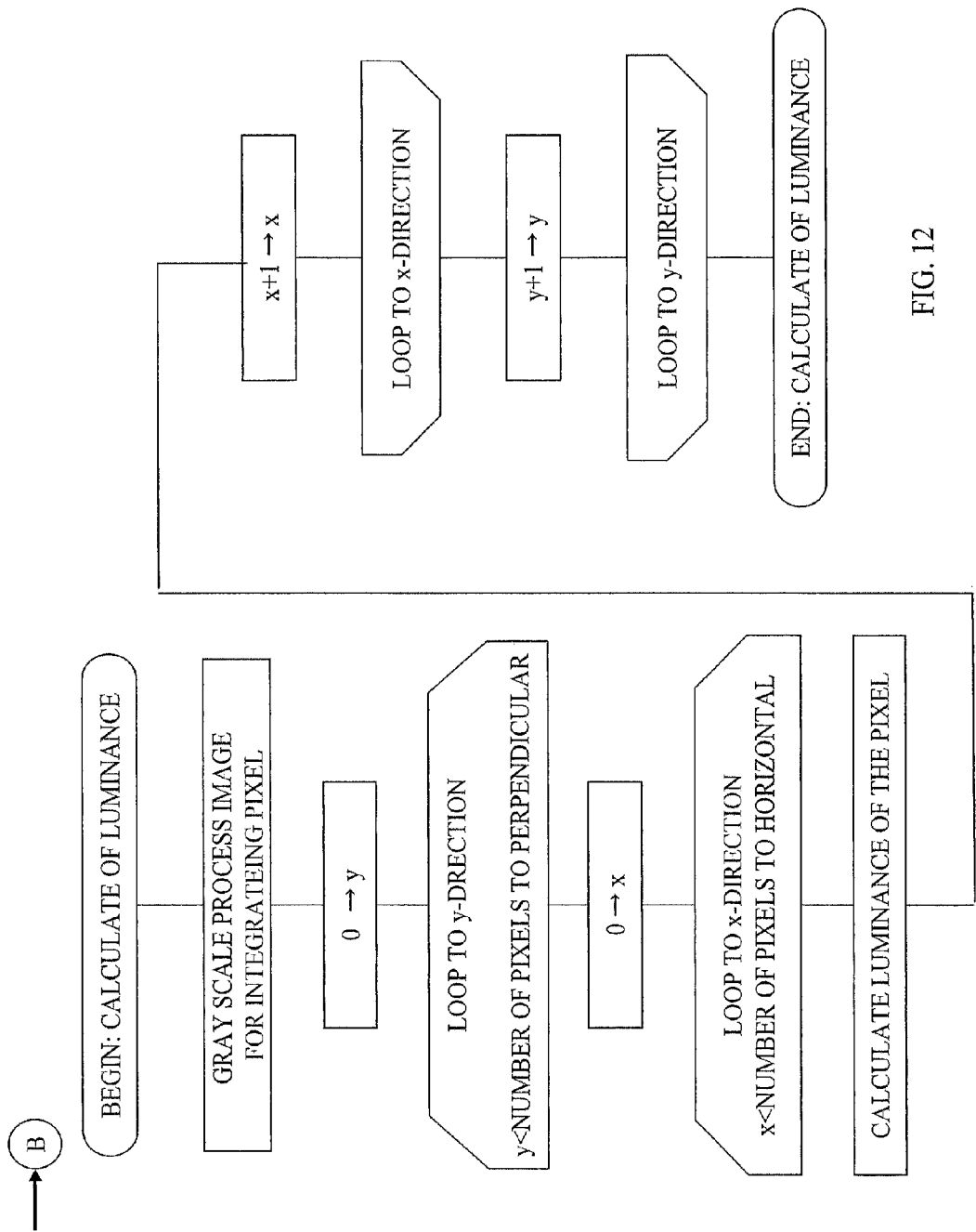
FIG. 12 is a flowchart showing image processing (luminance calculation flow) according to the invention.

FIG. 12 shows a flow of luminance calculation by the pixel unit, namely processing for integrating a pixel unit.

In the case of a colored image for being evaluated, the images color may be transformed into luminance data from white to black of 256 steps (hereinafter, refereed to as gray scale) with extracting luminance from the image or may be processed every element value in colorimetric system such as RGB as described in Embodiment Mode 1.

Next, calculation of a color component of a pixel of (x, y) of panel is looped to a y direction and an x direction. The loop to the y direction is carried out from 0 to (n−1), and the loop to the x direction is carried out from 0 to (m−1). Note that either loop of x or y may be started firstly.

Figure 20A:
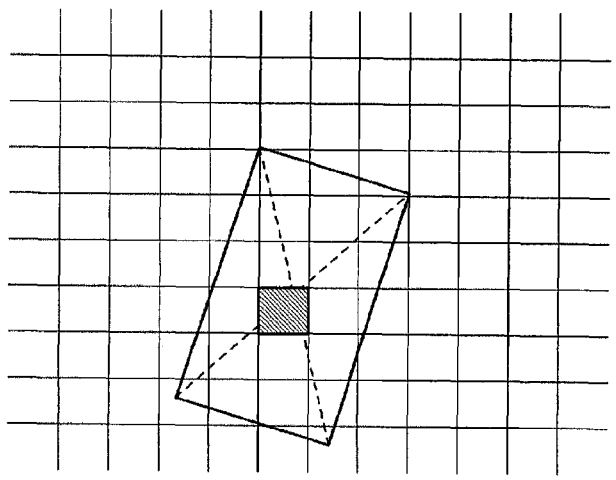
FIG. 20A to 20C are explanatory views of a nearest neighbor method, a bilinear method and an area integration method which calculate luminance according to the invention.
Figure 20B:
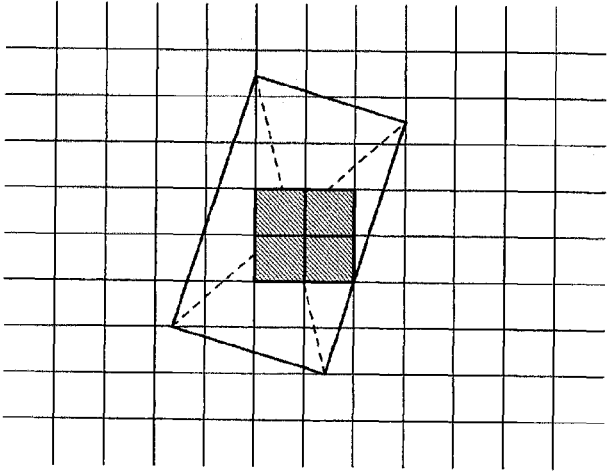
Figure 20C:
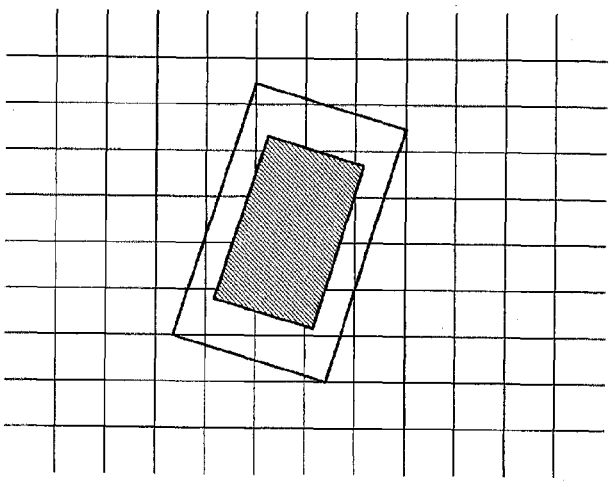

Note that, in the case of carrying out luminance calculation by the pixel unit, for example, any one of a center neighbor method by which a value of 1 dot in a center of a pixel region is taken (refer to FIG. 20A), a bilinear method by which a summation is taken by weighting a value of 4 dots in the center neighbor of the pixel region with a distance from the center (refer to FIG. 20B), and an area integration method by which an integration value of an area of an enlarged or reduced pixel region is divided by an area of a region and taking the average (refer to FIG. 20C) can be employed.

Figure 13:
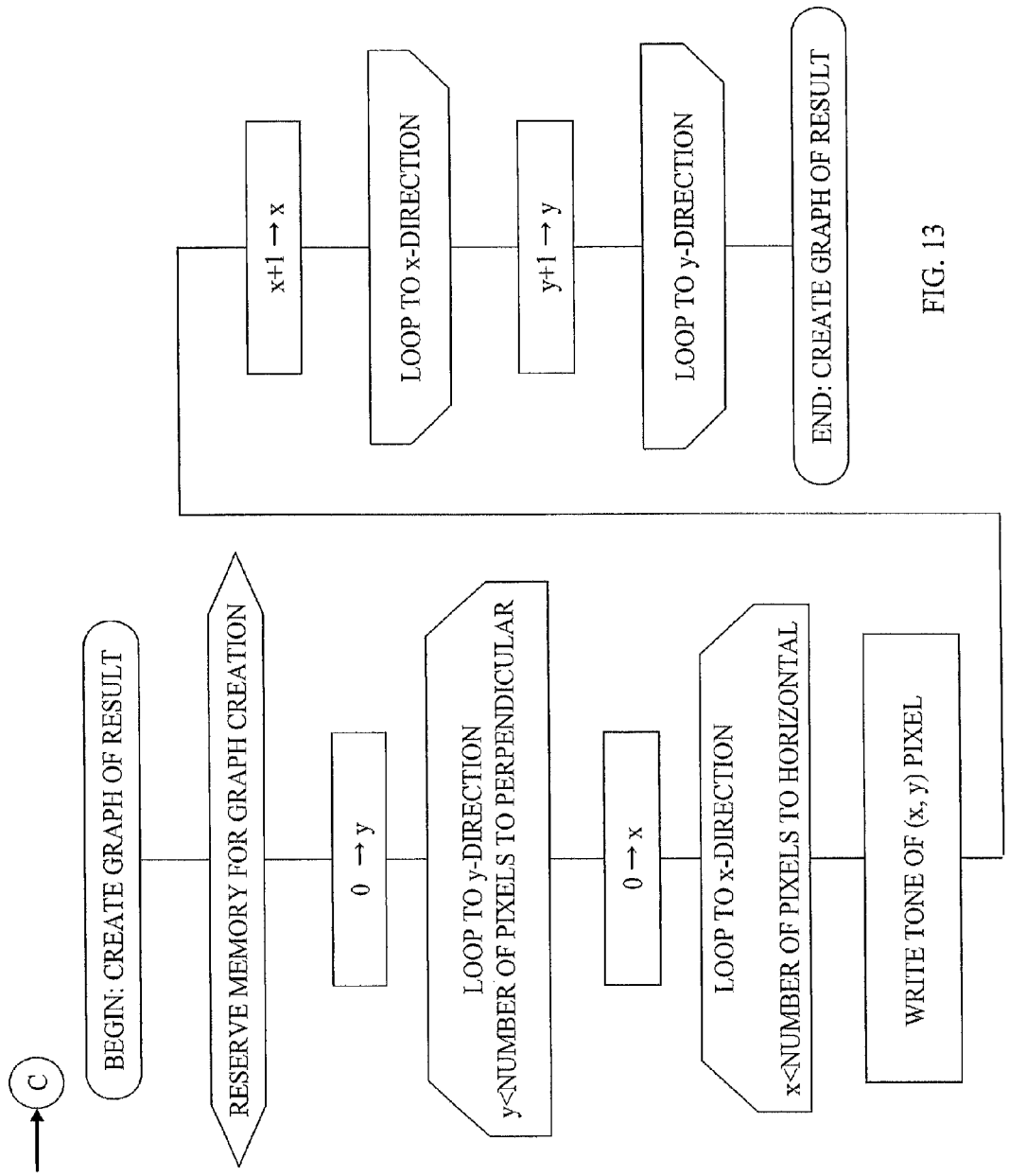
FIG. 13 is a flowchart showing image processing (graph production flow) according to the invention.
Figure 17:
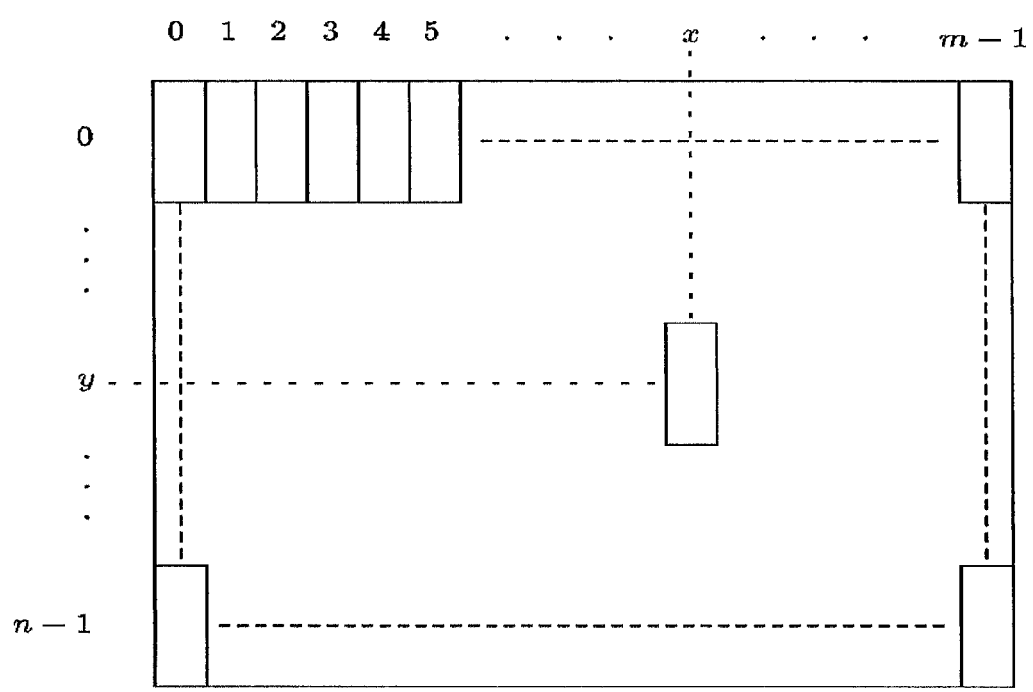
FIG. 17 is a schematic view of an image of defect point form (an image for integrating a pixel unit) according to the invention.

A graph creation is completed through the following steps as shown in FIG. 13: reserving a memory for graph creation (hereinafter, referred to as a memory for a graph image) and writing a tone corresponding to a value of luminance of integrating a pixel unit calculated with respect to all pixels of m×n to the memory for a graph image. FIG. 17 shows a schematic view of the created graph. The created graph becomes an image in which the influence of moire is reduced by processing for integrating a pixel unit and a non-display area does not exist between pixels. The image is equivalent to that shown in FIG. 5.

Figure 19:
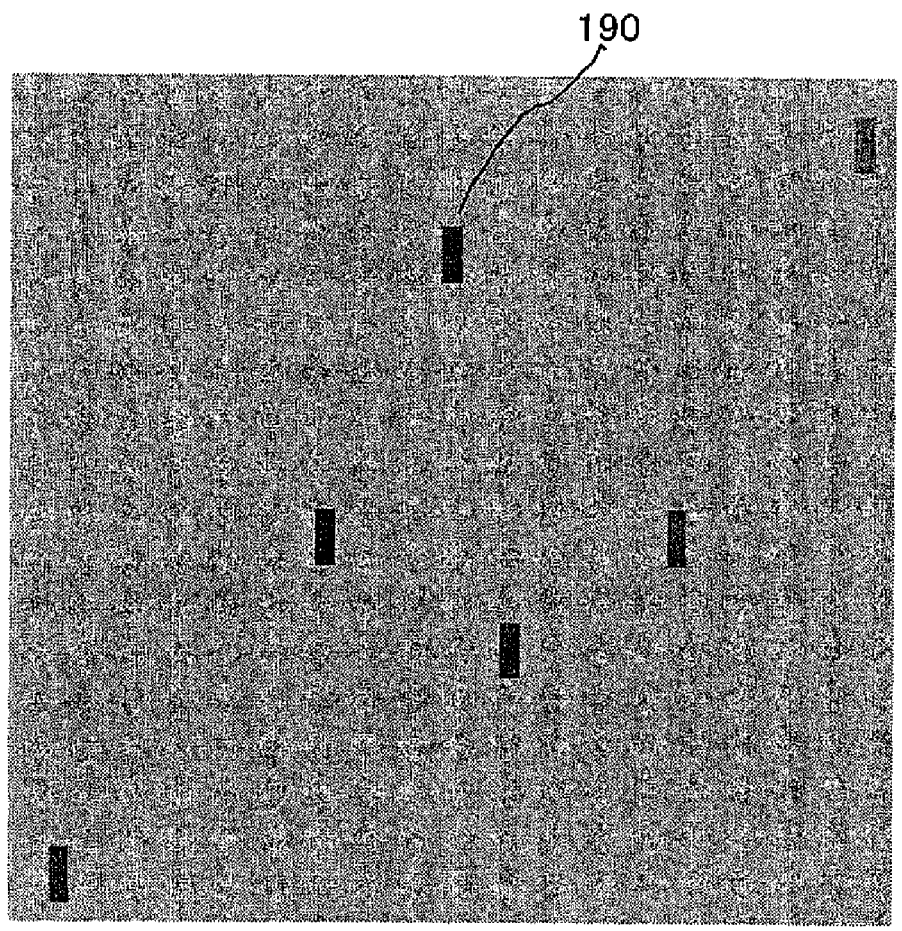
FIG. 19 is a partly enlarged image of an image of defect point form (an image for integrating a pixel unit) according to the invention.

FIG. 19 shows an image in which a part of FIG. 5 is enlarged. In this image, 6 pieces of poor pixel data 190 after processing for integrating a pixel unit corresponding to a poor pixel 180 shown in FIG. 18 are observed. The processing is carried out by the pixel unit; therefore, it is found that data of the poor pixel portion has little influence on a peripheral pixel portion.

Figure 14:
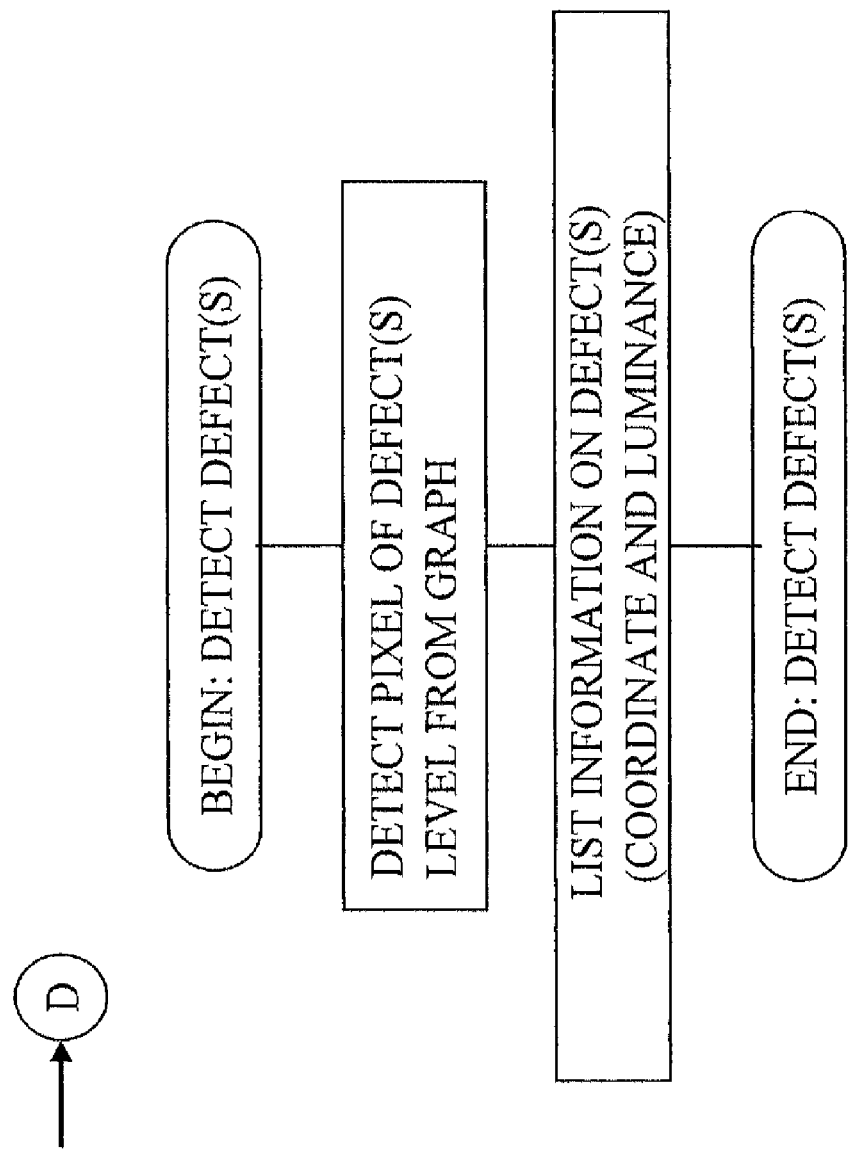
FIG. 14 is a flowchart showing image processing (defect detection flowchart) according to the invention.

Detecting a defect is completed as shown in FIG. 14 by detecting a pixel of a panel corresponding to each defect level from a graph, and by listing information on the defect, namely information on a coordinate and luminance.

Figure 15:
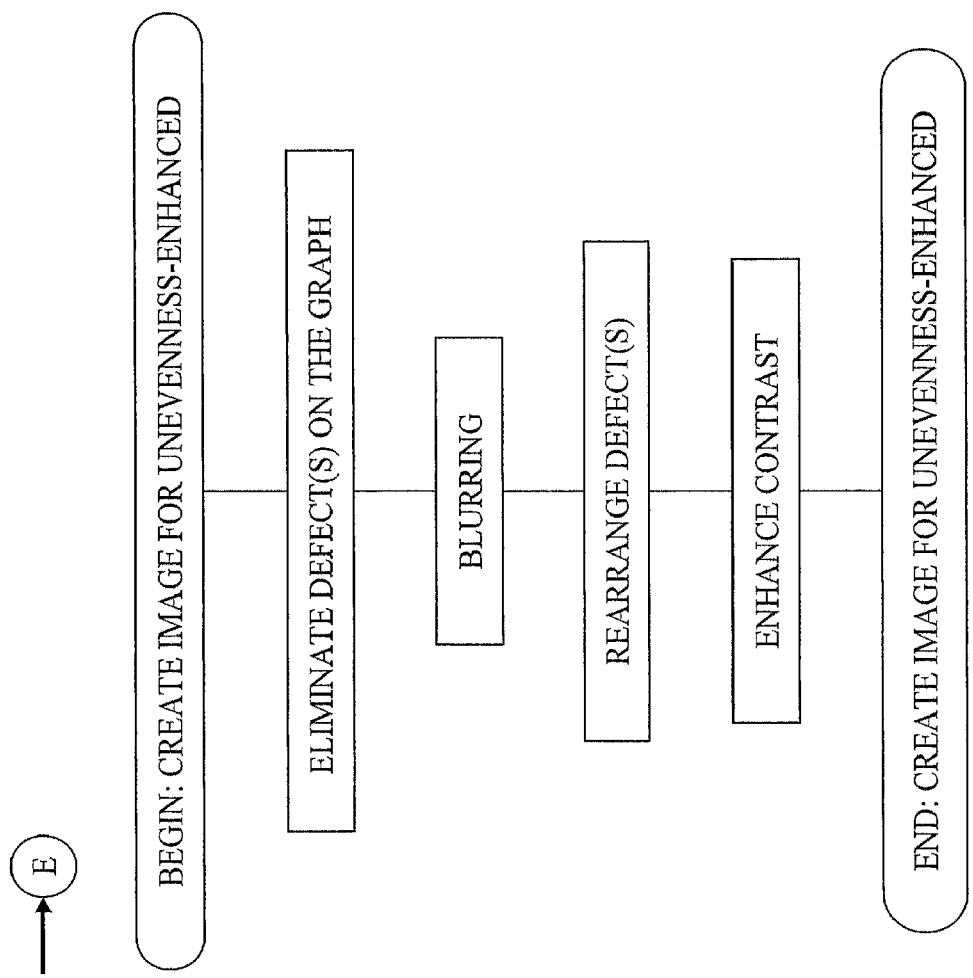
FIG. 15 is a flowchart showing image processing (unevenness-enhanced image production flow) according to the invention.

The production of an unevenness-enhanced image is completed through the following steps as shown in FIG. 15: eliminating data of a defect pixel on the graph by replacing data of a peripheral non-defect pixel; blurring; rearranging a defect, namely rewriting; and enhancing contrast. Consequently, as shown in FIG. 9, blurring to erase moire can be carried out without blurring a display defect portion, and further, an image in which display unevenness of original panel can be outputted.

Embodiment Mode 3

Figure 27:
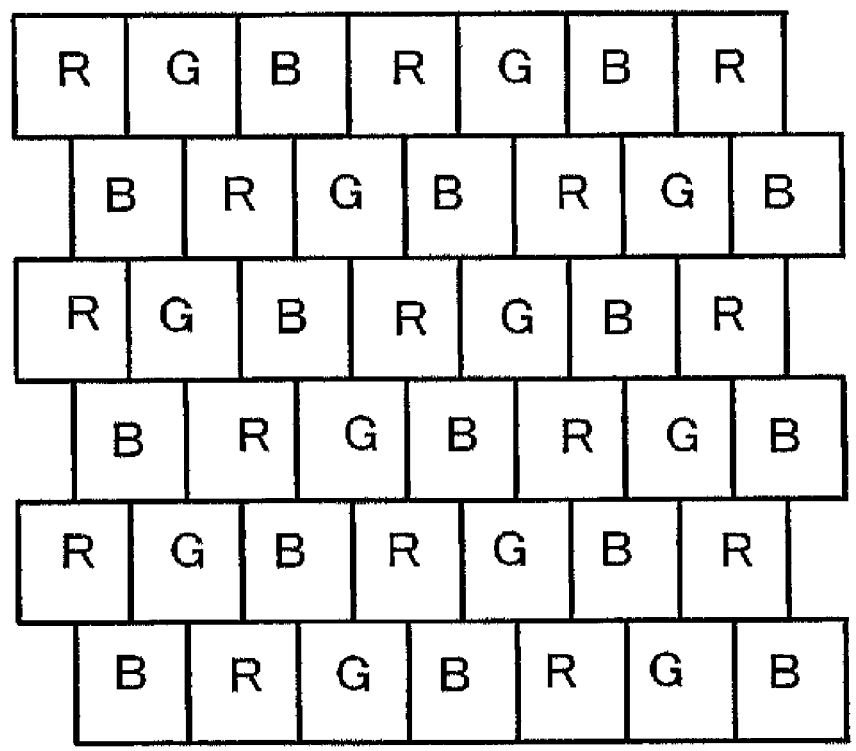
FIG. 27 is a schematic view of a delta array pixel according to the invention.

An image analysis method according to the present invention can be applied to a panel having a pixel of delta array as shown in FIG. 27. Note that delta array is not limited to a mode shown in FIG. 27.

Figure 28:
FIG. 28 is a schematic view of a delta array pixel according to the invention.
Figure 29:
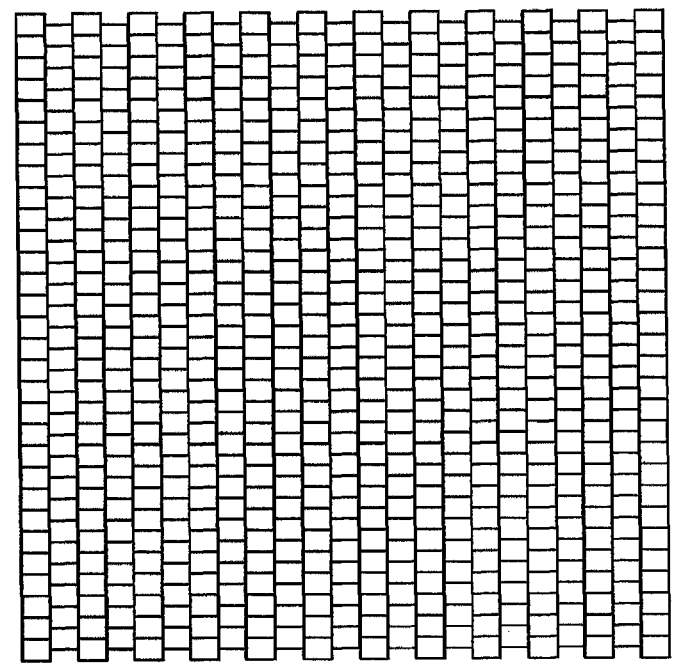
FIG. 29 is a schematic view in which a processing of displacing by half pixel is carried out to a pixel according to the invention.
Figure 29:
Figure 29:
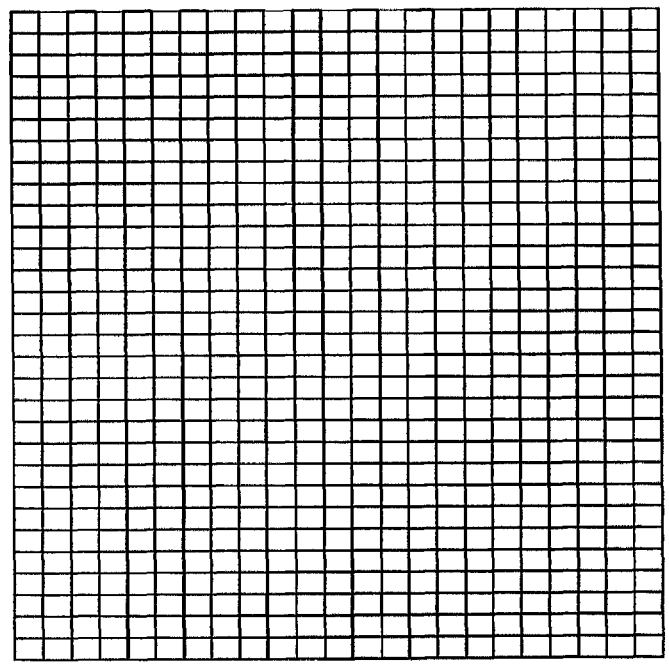

A lattice image which is the same as a pixel arrangement shown in Embodiment Modes 1 and 2, namely stripe array, may be used in such delta array when detecting a coordinate. At this time, a perpendicular line is recognized as a wavy line in delta array as shown in FIG. 28. Therefore, dilation is carried out for making the wavy line to a continuous line. Specifically, dilation is carried out in a process during after the beginning of perpendicular line detection and before the replacing of x-y coordinate of a pixel for detecting a coordinate, which is shown in FIG. 11C.

Next, a pixel of delta array is required to be changed to stripe array. In other words, a corresponding location is required to be displaced by half pixel at the stage in which a detected lattice line is divided and complement in the case of stripe array. Especially, processing for displacing a pixel by half pixel is carried out in a process during after interpolating and extrapolating a pixel along the edge of a panel and before specifying a coordinate, which is shown in FIG. 11D. Such processing may be added to algorithm of stripe array shown in the above Embodiment Mode.

As described above, an image analysis method according to the invention can be applied to a panel having a pixel of delta array.

EMBODIMENT

Embodiment 1

In this embodiment, a specific standard method for evaluating a defect of a blind spot to an entire white image is described.

First, as shown in Embodiment Mode 1, the entire white image in panel display is shot with a digital camera. Then, a defect of a blind spot is counted by using an image analysis program.

Specification of a panel used for shooting in this embodiment is shown in Table 1.

TABLE 1

| Display Size | 2.1 inch |
|---|---|
| arrenging of pixel | stripe shape consist of RGB |
| pixel number | (176 × 3) holizonal × 220 vertical |
| pixel pitch | 63 μm × 189 μm |

A condition of shooting is as follows: using a digital camera of OLYMPUS CAMEDIA E-20 (CCD sensor type) of aperture=2.4 and shutter speed=1/20 sec; using a macro lens; shooting with a macro mode; and saving of an image=JPEG compression level 2.7.

A shooting and an evaluation are carried out in the above condition as shown in the above embodiment mode. FIG. 5 shows an image after processing from integrating a pixel unit to adjusting aspect ratio. FIG. 6 shows an image of a defect point form. FIG. 7 shows an image of a defect mark form.

Note that processing for integrating a pixel unit is calculated by integrating 100% (an entire region in which one primary pixel is accounted) in either horizontal or perpendicular direction.

In the above processing, as a threshold of a blind spot, level 1 is set from 0 to 59, level 2 is set from 60 to 99, and level 3 is set from 100 to 139 among 256 tones of from 0 to 255. The result of counting blind spots of each level is as follows: 145 pieces in level 1, 201 pieces in level 2, and 193 pieces in level 3. However, a group of point defects are generated in the upper left corner of a display area of the panel among the above defects; therefore, the area is separately evaluated as an area of the group of point defects. As a result, the number of isolated blind defects except the area of the group of point defects is as follows: 14 pieces in level 1, 82 pieces in level 2, and 106 pieces in level 3.

As described above, according to the present invention, moire and unevenness of a panel can be distinctively evaluated even if a digital camera having not so high resolution is used, and further, a defect can be grasped as well as a pixel coordinate of the panel.

Embodiment 2

In this embodiment, a specific standard method for evaluating a defect of a bright spot to an entire black image is described.

First, a shooting is carried out with the same panel and digital camera as in Embodiment 1. However, shutter speed is set to 1 sec so as to increase sensitivity for detecting a bright defect.

Figure 21:
FIG. 21 is an image that a processing for integrating a pixel unit, adjusting aspect ratio and the like are carried out to an entire black image in the invention.
Figure 22:
FIG. 22 is an image of defect point form of an entire black image according to the invention.
Figure 23:
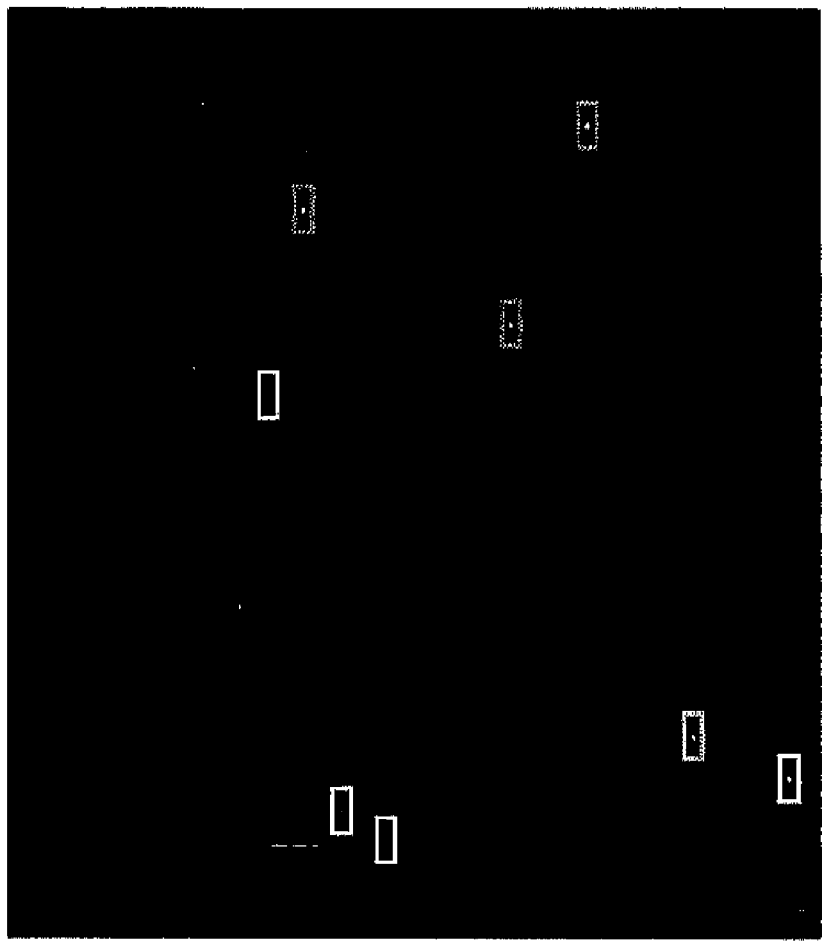
FIG. 23 is an image of a defect mark form of an entire black image according to the invention.

FIG. 21 shows an image after the step from integrating a pixel unit to adjusting aspect ratio. FIG. 22 shows an image of a defect point form. FIG. 23 shows an image of a defect mark form.

As a threshold of a bright spot, level 1 is set from 255 to 200, level 2 is set from 199 to 150, and level 3 is set from 149 to 100 among 256 tones of from 255 to 0. The result of counting bright spots of each level is as follows: 3 pieces in level 1, 1 piece in level 2, and 4 pieces in level 3.

In this embodiment, a group of bright defects does not exist; therefore, the number of counted bright defects can be referred to as the number of isolated bright defects.

Note that, when detecting a bright defect, there is a case that an adjacent normal pixel is counted as a defect, for example, regardless of an isolated point defect, since light from a bright defect portion leaks onto a periphery of a pixel. Therefore, a method by which a pixel having comparatively low-level point defect is not counted judging as an influence of light leakage may be employed in the case where the pixel having comparatively low-level point defect is adjacent to a pixel having high-level point defect. In this embodiment, counting is carried out by using the above method with implementing a measure for light leakage.

As described above, according to the present invention, a defect can be grasped as well as a pixel coordinate of a panel even if a digital camera having not so high resolution is used.

Embodiment 3

In this embodiment, a case of carrying out an image processing such as blurring an image or enhancing contrast of an image is described.

As shown in FIG. 5, in the case where processing such as integrating a pixel unit and adjusting aspect ratio are carried out to an entire white image, a little moire remain though moire can be reduced more compared with a source of an image of FIG. 3 in which an image processing is not carried out.

Consequently, a blind defect is counted in advance based on a threshold of a defect which is the same as in Embodiment 1 in an image for integrating a pixel unit of FIG. 5. Then, each defect is separately saved as a data file for information on a defect, in addition to coordinate data thereof.

Next, processing in which a detected defect portion is overwritten by an average value of data of the periphery pixel is carried out. Then, processing for blurring an image with a lowpass filter is carried out. At this time, data of each pixel is saved as real number (floating point number) without transforming to an integer value. And then, the image is overwritten after blurring each defect based on a content of the data file for information on a defect which is saved. Thereafter, contrast enhancing process is carried out.

FIG. 9 shows an image processed to a panel which is the same as in Embodiment 1 as described above.

According to the series of the processing described above, blurring can be carried out without blurring a display defect portion and the periphery thereof, and a moire-erased image with enhancing display unevenness more can be outputted, as well as further reducing the influence of moire more. Furthermore, contrast enhancing process is carried out by each pixel data based on a real number value after blurring; therefore, a smoother image can be obtained compare with a case of transforming to an integer value such as 256 tones after blurring.

Embodiment 4

In this embodiment, an image processing of the case where a panel is set in a state that is fixed so as to shift against a digital camera, namely a state that has a rotational shift, is described.

Figure 24:
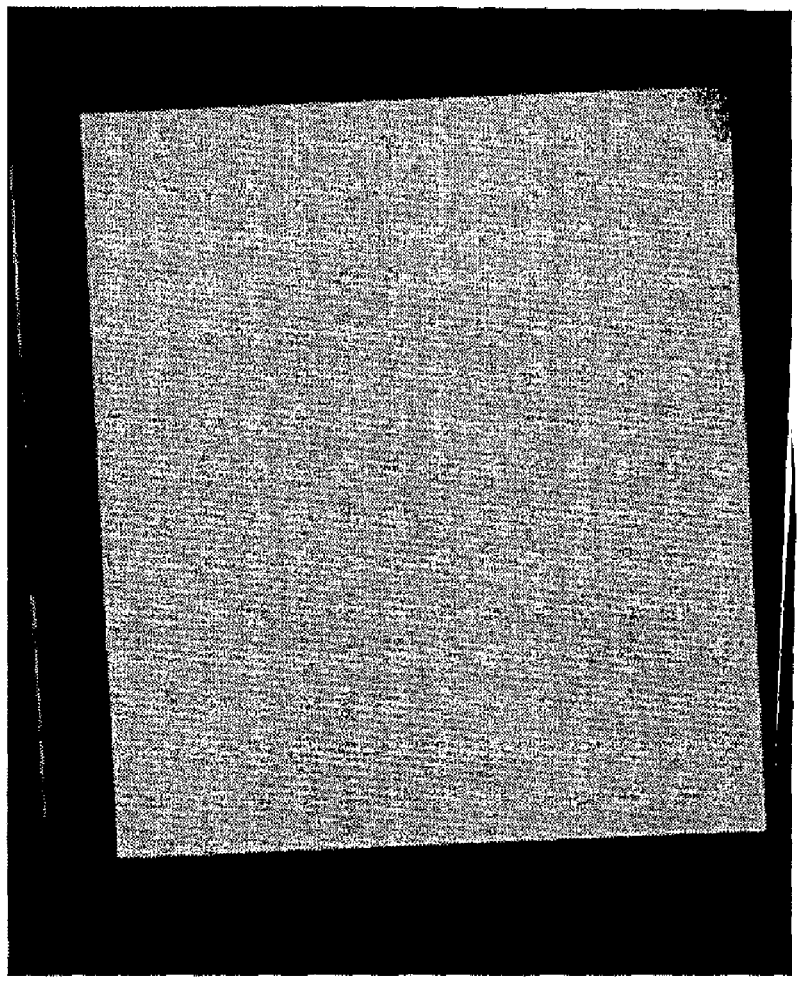
FIG. 24 is an entire white image shot in a state that a panel is arranged in shifting according to the invention.

As shown in FIG. 24, the panel is set so as to be artificially shifted (rotated) for approximately from 2° to 3° to the right. Then, a shooting of the panel is carried out with a digital camera as shown in Embodiment Mode 1. Note that, in this embodiment, evaluation is carried out with the same panel as in Embodiment 1.

Figure 25:
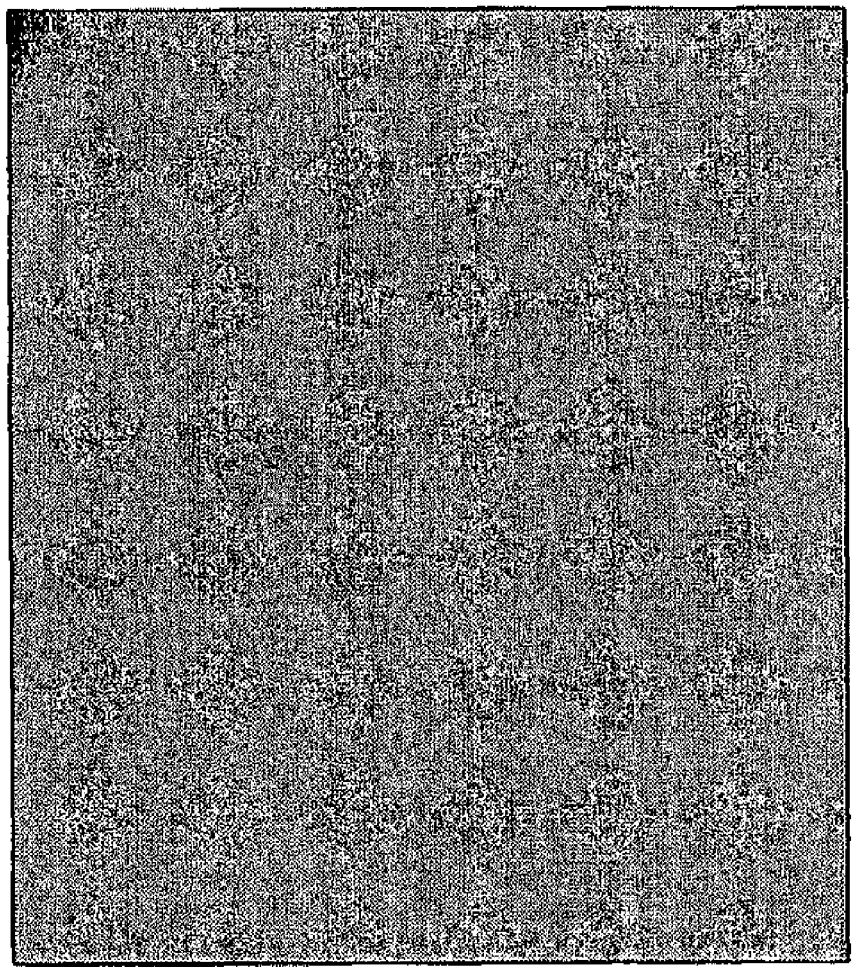
FIG. 25 is an image of defect point form (an image for integrating a pixel unit) of an entire white image in a state that a panel is arranged in shifting according to the invention.
Figure 26:
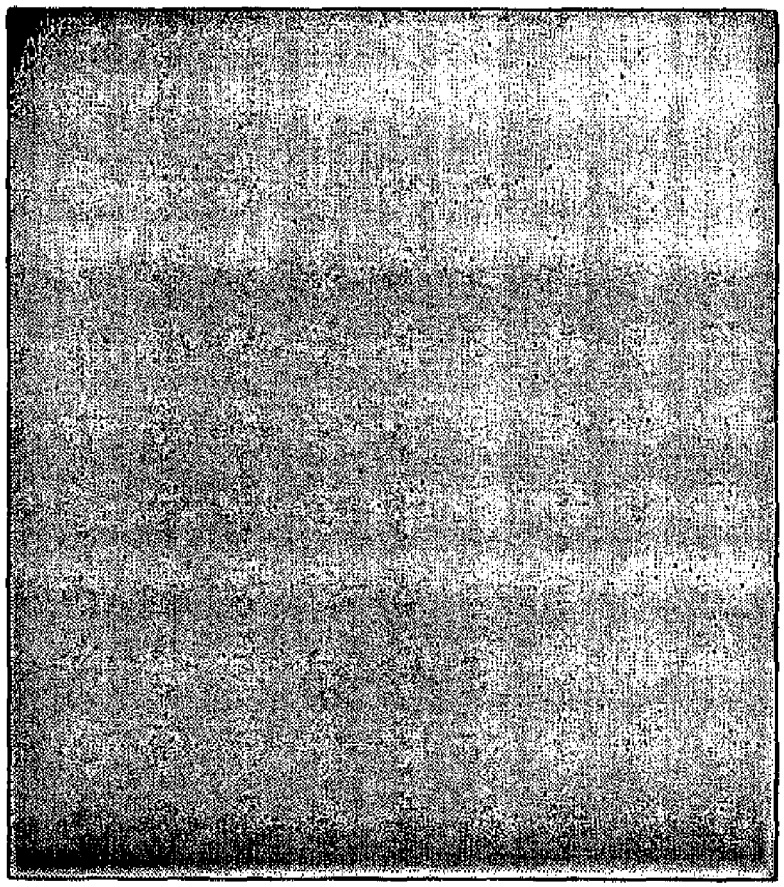
FIG. 26 is a moire-erased image of an entire white image in a state that a panel is arranged in shifting according to the invention.

FIG. 25 shows an image for integrating a pixel unit to which the same processing as in Embodiment 1 is carried out. FIG. 26 shows a moire-erased image to which the same processing as in Embodiment 3 is carried out.

The panel is shot by being tilted artificially to the camera when shooting with the digital camera; accordingly, moire is reduced. Therefore, an image analysis method according to this embodiment is suitable for evaluating display unevenness having a linear shape, which especially appears in a horizontal or perpendicular direction to a display area of the panel.

This application is based on Japanese Patent Application serial no. 2004-122618 filed in Japan Patent Office on Apr. 19, 2004, the contents of which are hereby incorporated by reference.

What is claimed is:

1. An image analysis method comprising the steps of:
shooting a first image displayed with a lattice design on a display panel with a digital camera to obtain a first image data;
detecting horizontal components of the first image data;
grouping the horizontal components;
sampling horizontal lines of the lattice design in the first image data by using a result of the grouping step;
carrying out curve approximation with respect to the horizontal lines of the lattice design in the first image data,
wherein the detecting step comprises steps of:
binarizing the first image data;
thinning a result of the binarizing step; and
carrying out horizontal dilation to a result of thinning step.

2. The image analysis method according to claim 1, further comprising a step of calculating a center position of each horizontal line by using luminance distribution of the first image data and the result of the grouping step.

3. The image analysis method according to claim 1, further comprising a step of recognizing a center coordinate of each unit in the first image by using a result of sampling the horizontal lines.

4. The image analysis method according to claim 3, further comprising steps of:
shooting a second image with the digital camera to obtain a second image data after recognizing the center coordinate of the each unit, and
calculating average luminance of each unit of the second image based on the center coordinate by averaging an image included in a range of a predetermined distance from the center coordinate of the each unit of the second image.

5. The image analysis method according to claim 3, wherein the unit is a pixel.

6. The image analysis method according to claim 1, further comprising steps of:
shooting an entire black image with the digital camera to obtain an entire black image data after shooting the first image; and
subtracting the entire black image data from the first image data before sampling the horizontal lines.

7. The image analysis method according to claim 1,
wherein a first image for integrating a unit is formed from the first image,
wherein a second image for integrating a unit is formed from a third image,
wherein the third image is shifted from the first image, and
wherein a difference process is carried out for the first image for integrating a unit and the second image for integrating a unit.

8. The image analysis method according to claim 1, further comprising steps of:
saving a position of a defect unit and an image data of the defect unit in a second image shot by the digital camera,
replacing the image data of the defect unit to an image data of a peripheral non-defect unit,
creating a blurred image, and
overwriting image data of the defect unit in the position of the defect unit in the blurred image.

9. An image analysis method comprising the steps of:
shooting a first image displayed with a lattice design on a display panel with a digital camera to obtain a first image data;
sampling horizontal lines of the lattice design in the first image data;
carrying out curve approximation with respect to the horizontal lines of the lattice design in the first image data;
carrying out curve approximation with respect to perpendicular lines of the lattice design in the first image data;
deriving intersection points of the horizontal lines and the perpendicular lines;
specifying coordinates of the first image by using the intersection points and a number of units included in a frame of the lattice design in the first image;
detecting horizontal components of the first image data after shooting the first image;
grouping the horizontal components; and
calculating a center position of each horizontal line by using luminance distribution of the first image data and a result of the grouping step,
wherein the detecting step comprises steps of:
binarizing the first image data;
thinning a result of the binarizing step; and
carrying out horizontal dilation to a result of thinning step.

10. The image analysis method according to claim 9, further comprising a step of recognizing a center coordinate of each unit in the first image by using a result of sampling the horizontal lines.

11. The image analysis method according to claim 10, further comprising steps of:
shooting a second image with the digital camera to obtain a second image data after recognizing the center coordinate of the each unit, and
calculating average luminance of each unit of the second image based on the center coordinate by averaging an image included in a range of a predetermined distance from the center coordinate of the each unit of the second image.

12. The image analysis method according to claim 9, wherein the unit is a pixel.

13. The image analysis method according to claim 9, further comprising steps of:
shooting an entire black image with the digital camera to obtain an entire black image data after shooting the first image; and
subtracting the entire black image data from the first image data before sampling the horizontal lines.

14. The image analysis method according to claim 9,
wherein a first image for integrating a unit is formed from the first image,
wherein a second image for integrating a unit is formed from a third image,
wherein the third image is shifted from the first image, and
wherein a difference process is carried out for the first image for integrating a unit and the second image for integrating a unit.

15. The image analysis method according to claim 9, further comprising steps of:
saving a position of a defect unit and an image data of the defect unit in a second image shot by the digital camera,
replacing the image data of the defect unit to an image data of a peripheral non-defect unit,
creating a blurred image, and
overwriting image data of the defect unit in the position of the defect unit in the blurred image.

16. An image evaluation system comprising:
a digital camera configured to shoot a first image displayed with a lattice design on a display panel: and
a computer comprising a recording medium including:
a program for detecting horizontal components of a first image data obtained by shooting the first image with the digital camera;

a program for grouping the horizontal components;
a program for sampling horizontal lines of the lattice design in the first image data by using a result of grouping the horizontal components; and
a program for carrying out curve approximation with respect to the horizontal lines of the lattice design in the first image data,
wherein the program for detecting the horizontal components comprises:
a program for binarizing the first image data;
a program for thinning a result of binarizing the first image data; and
a program for carrying out horizontal dilation to a result of thinning the result of binarizing the first image data.

17. The image evaluation system according to claim 16, wherein the recording medium is further recorded a program for calculating a center position of each horizontal line by using luminance distribution of the first image data and the result of grouping the horizontal components.

18. The image evaluation system according to claim 16, wherein the recording medium is further recorded a program for recognizing a center coordinate of each unit in the first image by using a result of sampling the horizontal lines.

19. The image evaluation system according to claim 18, wherein the recording medium is further recorded:
a program for shooting a second image with the digital camera to obtain a second image data after recognizing the center coordinate of the each unit, and
a program for calculating average luminance of each unit of the second image based on the center coordinate by averaging an image included in a range of a predetermined distance from the center coordinate of the each unit of the second image.

20. The image analysis method according to claim 18, wherein the unit is a pixel.

21. The image evaluation system according to claim 16, wherein the recording medium is further recorded:
a program for shooting an entire black image with the digital camera to obtain an entire black image data after shooting the first image; and
a program for subtracting the entire black image data from the first image data before sampling the horizontal lines.

22. The image evaluation system according to claim 16, wherein a first image for integrating a unit is formed from the first image,
wherein a second image for integrating a unit is formed from a third image,
wherein the third image is shifted from the first image, and
wherein a difference process is carried out for the first image for integrating a unit and the second image for integrating a unit.

23. The image evaluation system according to claim 16, wherein the recording medium is further recorded:
a program for saving a position of a defect unit and an image data of the defect unit in a second image shot by the digital camera,
a program for replacing the image data of the defect unit to an image data of a peripheral non-defect unit,
a program for creating a blurred image, and
a program for overwriting image data of the defect unit in the position of the defect unit in the blurred image.

24. An image evaluation system comprising:
a digital camera configured to shoot a first image displayed with a lattice design on a display panel: and
a computer comprising a recording medium including:

a program for sampling horizontal lines of the lattice design in a first image data obtained by shooting the first image with the digital camera;
a program for carrying out curve approximation with respect to the horizontal lines of the lattice design in the first image data, and
a program for carrying out curve approximation with respect to perpendicular lines of the lattice design in the first image data;
a program for deriving intersection points of the horizontal lines and the perpendicular lines; and
a program for specifying coordinates of the first image by using the intersection points and a number of units included in a frame of the lattice design in the first image,
wherein the recording medium is further recorded:
a program for detecting horizontal components of the first image data after shooting the first image;
a program for grouping the horizontal components; and
a program for calculating a center position of each horizontal line by using luminance distribution of the first image data and a result of grouping the horizontal components,
wherein the program for detecting horizontal components comprises:
a program for binarizing the first image data;
a program for thinning a result of binarizing the first image data; and
a program for carrying out horizontal dilation to a result of thinning the result of binarizing the first image data.

25. The image evaluation system according to claim 24, wherein the recording medium is further recorded a program for recognizing a center coordinate of each unit in the first image by using a result of sampling the horizontal lines.

26. The image evaluation system according to claim 25, wherein the recording medium is further recorded:
a program for shooting a second image with the digital camera to obtain a second image data after recognizing the center coordinate of the each unit, and
a program for calculating average luminance of each unit of the second image based on the center coordinate by averaging an image included in a range of a predetermined distance from the center coordinate of the each unit of the second image.

27. The image analysis method according to claim 24, wherein the unit is a pixel.

28. The image evaluation system according to claim 24, wherein the recording medium is further recorded:
a program for shooting an entire black image with the digital camera to obtain an entire black image data after shooting the first image; and
a program for subtracting the entire black image data from the first image data before sampling the horizontal lines.

29. The image evaluation system according to claim 24, wherein a first image for integrating a unit is formed from the first image,
wherein a second image for integrating a unit is formed from a third image,
wherein the third image is shifted from the first image, and
wherein a program for a difference process is carried out for the first image for integrating a unit and the second image for integrating a unit.

30. The image evaluation system according to claim 24, wherein the recording medium is further recorded:
a program for saving a position of a defect unit and an image data of the defect unit in a second image shot by the digital camera,
a program for replacing the image data of the defect unit to an image data of a peripheral non-defect unit,
a program for creating a blurred image, and a program for overwriting image data of the defect unit in the position of the defect unit in the blurred image.

31. The image analysis method according to claim 1, wherein a liquid crystal display panel includes the display panel.

32. The image analysis method according to claim 9, wherein a liquid crystal display panel includes the display panel.

33. The image evaluation system according to claim 16, wherein a liquid crystal display panel includes the display panel.

34. The image evaluation system according to claim 24, wherein a liquid crystal display panel includes the display panel.

* * * * *